United States Patent [19]
Kajita

[11] Patent Number: 5,476,142
[45] Date of Patent: Dec. 19, 1995

[54] FLEXIBLE CONTAMINANT-RESISTANT GROUT COMPOSITION AND METHOD

[75] Inventor: Laura Kajita, Palatine, Ill.

[73] Assignee: American Colloid Company, Arlington Heights, Ill.

[21] Appl. No.: 364,091

[22] Filed: Dec. 27, 1994

Related U.S. Application Data

[63] Continuation-in-part of Ser. No. 128,598, Sep. 29, 1993, Pat. No. 5,407,879.

[51] Int. Cl.$^6$ .............................. E21B 33/14; E02D 3/12
[52] U.S. Cl. .................... 166/294; 106/803; 166/292; 405/264; 405/267
[58] Field of Search ..................... 166/292, 293, 166/294, 264; 405/267; 106/803

[56] References Cited

U.S. PATENT DOCUMENTS

| | | | |
|---|---|---|---|
| 2,367,384 | 1/1945 | Tymstra et al. | |
| 2,672,442 | 3/1954 | Clem . | |
| 3,487,928 | 1/1970 | Canevari . | |
| 4,021,402 | 5/1977 | Clem . | |
| 4,149,968 | 4/1979 | Kupiec et al. | 405/128 X |
| 4,332,693 | 6/1982 | Piepho | 252/181 |
| 4,415,467 | 11/1983 | Piepho | 252/181 |
| 4,462,470 | 7/1984 | Alexander et al. | 175/72 |
| 4,517,094 | 5/1985 | Beall | 210/664 |
| 4,613,542 | 9/1986 | Alexander | 428/290 |
| 4,624,982 | 11/1986 | Alexander | 524/446 |
| 4,650,590 | 3/1987 | Beall | 210/691 |
| 4,669,920 | 6/1987 | Dymond | 405/264 |
| 4,687,790 | 8/1987 | Andreichuk | 405/264 |
| 4,696,698 | 9/1987 | Harriett | 405/267 X |
| 4,696,699 | 9/1987 | Harriett | 405/267 X |
| 4,797,158 | 1/1989 | Harriett | 405/267 X |
| 4,964,918 | 10/1990 | Brown et al. | 106/811 |
| 4,984,933 | 1/1991 | Annett et al. | 166/293 X |
| 5,106,423 | 4/1992 | Clarke | 166/293 X |
| 5,114,893 | 5/1992 | Hughes | 501/149 |
| 5,120,344 | 6/1992 | Libor et al. | 405/264 X |
| 5,312,807 | 5/1994 | Hughes | 507/100 |
| 5,318,953 | 6/1994 | Hughes | 507/100 |

FOREIGN PATENT DOCUMENTS

| | | |
|---|---|---|
| 0495108A1 | 7/1992 | European Pat. Off. . |
| 1439734 | 6/1976 | United Kingdom . |

*Primary Examiner*—George A. Suchfield
*Attorney, Agent, or Firm*—Marshall, O'Toole, Gerstein, Murray & Borun

[57] ABSTRACT

A flexible grout composition and method of disposing the composition in position, in contact with an earthen formation, such as a coating on a trench wall, or within a bore hole, for example to cement a conduit within the bore hole to prevent fluid loss, for sealing and grouting well casings, plugging abandoned wells, and waterproofing earthen structures, particularly in environments where the grout composition is in contact with contaminated water. The flexible grout composition includes a water-swellable clay, such as sodium bentonite; an optional solid particulate filler, such as an essentially nonswellable bentonite clay, such as calcium bentonite, herein defined as a bentonite clay having calcium as the predominant exchangeable cation; a water-soluble polymer; and an optional dispersing agent, such as sodium acid pyrophosphate (SAPP).

27 Claims, No Drawings

5,476,142

FLEXIBLE CONTAMINANT-RESISTANT GROUT COMPOSITION AND METHOD

CROSS-REFERENCE TO RELATED APPLICATION

This application is a continuation-in-part of application Ser. No. 08/128,598, filed Sep. 29, 1993, now U.S. Pat. No. 5,407,879.

FIELD OF THE INVENTION

The present invention is directed to a set-table grout composition particularly useful in the well and geotechnical industries for sealing and grouting well casings, plugging abandoned wells, and waterproofing earthen structures, wherein the grout composition is in contact with contaminated water. More particularly, the present invention is directed to a grout composition mixable with water to form a thixotropic cement slurry particularly useful in stabilizing earthen walls in an earth excavation process, such as in digging trenches; and more particularly in cementing conduit into mine shafts, water wells, oil wells, waste-disposal wells, steam producing wells, thermal recovery wells and other types of wells. In the process of cementing conduit into shafts and wells, the conduit is cemented in place by pouring or pumping the slurry into an annular space between the outer surface of the conduit and the surrounding earthen formation to prevent fluid loss from the well.

BACKGROUND OF THE INVENTION AND PRIOR ART

Thixotropic cement slurries have been used for many years in cementing conduits into drilled bore holes to prevent fluid loss from the well to the surrounding earthen formation. The prior art suggests a number of compositions mixable with water to form a slurry capable of reducing the fluid loss to the surrounding formation or capable of providing a hardened cement to permanently set the conduit into position without fluid loss. Among these prior art compositions, it is known to use bentonite clay in pellet or slurry form to prevent fluid loss and it is known to use a mixture of bentonite clay with Portland cement settable to a hard condition for permanently fixing the conduit within the bore hole. The following patents disclose various soil sealing compositions:

Harriett U.S. Pat. Nos. 4,696,698; 4,696,699; and 4,797,158 disclose grout compositions containing water-swellable sodium bentonite clay; a filler; such as calcium bentonite; a dispersing agent, such as SAPP; and a water-soluble silicate, such as an alkali metal silicate.

Mason U.S. Pat. No. 4,463,808 discloses a well fluid and bore hole sealing composition including water, a water-swellable clay and a water dispersible polymer, such as an emulsion polymerized hydrolyzed polyacrylamide to prevent the immediate hydration of the clay.

Tazawa et al. U.S. Pat. No. 4,004,428 is directed to a process for stabilizing soil by injecting into the soil a grout mixture comprising an aqueous sodium silicate solution, an aqueous solution of a gelling agent consisting of chlorides, sulfates and nitrates of aluminum, magnesium and iron and then gelling the injected mixture in the soil by adding at least one oxy acid.

The Kim et al. U.S. Pat. No. 3,615,790 is directed to the gelling of an aqueous solution of vegetable polyphenolic material derived from coniferous tree bark or tannins of catechin or condensed type of reaction with alkali metal silicates, preferably sodium or potassium silicate. The compositions may be modified with additional material such as bentonite clay, Portland cement and the like.

The Chesney, Jr. et al. U.S. Pat. No. 4,447,267 is directed to a Portland cement based grout composition including bentonite clay, a filler and a composite of a cellulose ether and a long chain polymer, such as polyacrylamide.

Crinkelmeyer et al. U.S. Pat. No. 4,102,400 is directed to a composition for contacting a well bore prior to disposing a thixotropic cement slurry in the well bore to initially prepare the well bore to prevent fluid loss. The slurry, used prior to the cement, is a gel formed by the reaction of a silicate with a multivalent metal cation; an inert particulate filler and a water-dispersible cellulose compound. This fluid is referred to as a "spacer fluid" since the fluid is frequently used ahead of the cement to displace the drilling mud from the bore hole.

Cementing or grouting of steel well casings in well bores dates back to the early twentieth century. Early uses were directed to filling a cement grout in the well bore annulus surrounding the casing to separate water from oil producing zones and for the completion of water wells. Wells are cased and cemented down to at least a lowest possible pumping level to prevent contamination of the pumped fluid from the surrounding earthen formation. In the case of impervious strata above the oil or water producing gravel or sand, the cement should extend from the surface down to the impervious strata. Further, more and more attention is now given to proper plugging of abandoned wells for the purpose of environmental protection. Cementing or grouting of abandoned wells is an environmentally acceptable procedure. The cement or grout cements the annular space between a hole and a liner or casing, and enters cavities in the surrounding earthen formation to seal the earthen formation against fluids entering the annular space.

The most typical cement compositions used in preventing well bore contamination and for plugging abandoned wells include bentonite clay pellets; neat cement compositions and compositions including both Portland cement and bentonite clay. Bentonite clay pellets, while generally effective in providing a water-impermeable layer surrounding the well casing, are difficult to position within the well bore annulus surrounding the well casing, particularly in small annular spaces. Bentonite pellets are dropped within the annular space and fall randomly creating various sized void spaces between pellets at different locations. The pellets sometimes become sticky and are difficult to drop within small annular spaces, but, if properly positioned, are effective because of the high concentration of water-swellable sodium bentonite. Generally, although the pellets themselves are essentially 100% sodium bentonite, spacing between pellets creates effectively about a 50% to 60% bentonite concentration within the annular space. The pellets must be positioned in their intended location prior to complete hydration so that, once positioned, the clay can swell to eliminate the void spaces. Consequently, bentonite pellets have a maximum useable depth through water of about 500 feet.

Water-swellable or sodium bentonite clay, when used together with Portland cement, aids in reducing shrinkage of the cement or grout composition but, still, substantial shrinkage occurs, sometimes resulting in undesirable inter-aquifer transfer. Other problems encountered with the above-described prior art cement compositions include a high alkalinity which can alter geotech analyses that rely on accurate pH determination for detection of metal ion contamination; permeability of the cement or grout composition after setting because of the properties of the composition or because of cracking of the cement due to ground shifting; the expense of Portland cement; heating of the cement or grout during curing causing weakening of the well casing, particularly where polymeric casings are used; corrosion of the iron-containing well casings because of toxicity of the cement or grout composition, or due to inadequate filling, e.g., shrinkage or cracking of the composition within the annulus, resulting in contamination of the recovered fluid or inadequate well plugging; abrasiveness of the cement or grout on the mixing equipment; initial relatively high viscosity of the composition when mixed with water resulting in more difficulty in completely filling an annulus, with bridging sometimes occurring in the annulus causing inter-zone transfer of fluid and/or contamination; and a non-flexible set cement resulting in cracking upon ground shifting or shrinkage and fluid contamination. The compositions of the present invention solve or improve each of the deficiencies in the above-described prior art compositions.

SUMMARY OF THE INVENTION

In brief, the present invention is directed to a flexible grout composition and method of disposing the composition in position, in contact with an earthen formation, such as a coating on a trench wall, or within a bore hole, for example to cement a conduit within the bore hole to prevent fluid loss, for sealing and grouting well casings, plugging abandoned wells, and waterproofing earthen structures. The flexible grout composition includes a water-swellable clay, such as sodium bentonite; an optional solid particulate filler, such as an essentially non-swellable bentonite clay, such as calcium bentonite, herein defined as a bentonite clay having calcium as the predominant exchangeable cation; a water-soluble polymer; and an optional dispersing agent, such as sodium acid pyrophosphate (SAPP). The grout composition is particularly useful in locations where the composition contacts a contaminated water, such as a salt-containing or organic liquid-containing water.

The grout composition is mixed with water to form a slurry and the slurry is pumped into its intended location, for example, within the annulus defined between an outer surface of a conduit or casing disposed within a bore hole, and the surrounding earthen formation formed, for example, by drilling.

It should be understood that the composition of the present invention is useful in any environment where it is desirable to protect a structure against liquid contact, and particularly against contaminated water contact. Within the first 15 minutes after the solid grout composition of the present invention is mixed with water, the slurry begins to gel, and between 15 minutes and about 1 hour, usually within about 45 minutes after mixing, the viscosity of the slurry reaches a point that it is no longer pumpable, depending on the type of mixing/pumping equipment used and the amount of solids in the mixture. After about 1 to about 4 hours, the composition loses its thixotropy and has an initial set. Between about 4 hours and about 24 hours the composition initially cures and reaches a relatively rigid, but somewhat flexible gel state. Within 24 to 72 hours, the composition reaches its final cure and achieves sufficient structural strength for a flexible grouting material.

When bentonite grouts are mixed and pumped into place, they have an "oatmeal" or "lumpy pancake batter" consistency. As the grout cures or solidifies in place, the lumps hydrate and "fuse" with the surrounding matter. It should be noted that although a grout mixture may not be readily pourable, it may still be pumpable.

In accordance with an important feature of the present invention, even after 72 hours or more after mixing, when the composition is completely cured, the grout material of the present invention is flexible, remains moldable, and, if a crack develops in the composition, water contact will cause the composition to expand to self-seal or fill in the crack to make the composition impermeable again. The cured composition is relatively hard, having the consistency of a stiff paste, such as a glazing compound or spackling compound, or a "peanut butter" consistency.

Accordingly, one aspect of the present invention is to provide a new and improved water-impermeable, flexible grout material.

Another aspect of the present invention is to provide a new and improved flexible grout material, containing essentially no Portland cement, and having the properties of essentially no heating or shrinking during curing.

Another aspect of the present invention is to provide a new and improved composition for cementing a conduit within a bore hole which maintains swellability and moldability after final curing so that the composition has the capability of self-healing if a crack develops, for example by ground movement surrounding the bore hole.

Still another aspect of the present invention is to provide a new and improved grout composition for filling an annulus between a conduit and a surrounding earthen formation formed by drilling or other excavation process wherein the composition can be pumped into a desired location in the form of a relatively low viscosity slurry for "ease of placement". After complete setting, the composition maintains a moldable, swellable consistency such as dense native clay, or other stiff pastes such as spackling compounds or glazing compounds such that if the conduit develops a void or aperture, the composition will fill the void, upon additional sodium bentonite hydration, to self-seal, thereby preventing water flow between the earthen formation and the conduit.

Still other aspects of the present invention are to provide a new and improved flexible cement or grout composition having the properties of improved water-impermeability to dissolved contaminant-containing, e.g., salt-containing water; cost effectiveness; decreased heating and shrinking upon curing; maintenance of flexibility so that the composition has the property of self-healing; the composition is easier to mix and is less abrasive to drilling equipment and other apparatus; and the composition unexpectedly is more impermeable to salt-containing, e.g., NaCl-containing, water than prior art grout compositions.

The above and other aspects and advantages of the present invention will become more apparent from the following detailed description of the preferred embodiments.

DETAILED DESCRIPTION OF THE PREFERRED EMBODIMENTS

The dry grout (prior to admixture with water) of the present invention, for later admixture with water, includes a water-swellable sodium bentonite clay, in an amount of about 50% to about 75% by weight of the water-insoluble solids in the composition; a solid, particulate filler, particularly an essentially non-swellable colloidal clay, such as calcium bentonite, in an amount of about 25% to about 45% by weight of the water-insoluble solids in the composition; and a water-soluble polymer, in an amount of about 0.01% to about 10%, based on the weight of bentonite clay solids in the grout composition, preferably about 0.5% to about 5% by weight. Optionally, in order to provide easier mixing of the composition with water, the composition includes a dispersing agent for the water-swellable clay, such as sodium acid pyrophosphate (SAPP) in an amount of about 0.05% to about 15% by weight of solids in the composition, preferably about 1% to about 10% based on the weight of water-insoluble solids in the composition.

To achieve the full advantage of the present invention, complete gelling of the water-swellable clay in the composition should not take place until the composition is disposed in place in contact with an earthen formation or otherwise surrounding a structure to be protected against contact by water by the water-impermeable grout composition. In this manner, the amount of water-swellable clay and other solids, such as the particulate filler, can be substantially increased while providing a pumpable slurry capable of being pumped into its intended location. Premature complete gelling of the water-swellable bentonite portion of the grout composition prior to pumping the composition into its intended location would necessarily limit the solids content of the pumpable composition substantially below that attainable by complete gelling occurring only after the composition is in place.

One way to assure that complete gelling of the water-swellable clay in the slurry does not take place until the grout composition is disposed in its intended location is to include a dispersing agent, such as sodium acid pyrophosphate, in the composition so that clay gel formation is delayed.

The particulate fillers suitable in the composition of the present invention in an amount of 0% to 75% by weight of the dry grout composition can be any particulate material, including calcium bentonite, and inert materials such as powdered silica materials, e.g., silica flour, talc, kaolin, illite, dolomite, mineral fillers including sand, rock, stone, pearlite particles, vermiculite, and other suitable inorganic particulate materials. To achieve the full advantage of the present invention, the solid particulate filler material is an essentially non water-swellable colloidal clay, particularly calcium bentonite. It has been found that the non water-swellable colloidal clays, particularly the non-swellable bentonites, such as calcium bentonite, prevent the breakdown of the grout composition after freezing, as would occur with some other solid fillers. Breakdown of the grout composition after freezing causes a substantial reduction in compression strength.

Water is added to the grout composition in an amount of about 25% to about 85% by weight of the composition, including the water, so that when the slurry is disposed in place in contact with an earthen formation to prevent water penetration from the earthen formation through the composition, the water-swellable clay will absorb the water and form a gel, substantially eliminating shrinkage from the grout composition except at the atmosphere-contacting surface of the composition. The most preferred grout composition, after admixture with water, contains about 25% by weight water-insoluble components and about 75% by weight water. The aqueous composition includes, where percentages are in percent by weight of the total composition: about 25% to about 85% water; about 7% to about 60% water-swellable sodium bentonite clay; about 4% to about 35% particulate filler, preferably calcium bentonite; and about 0.001% to about 8% water-soluble polymer. Optionally, the slurry preferably also includes about 0.01% to about 12% of a dispersing agent for the water-swellable clay based on the weight of water-insoluble solids. Preferably, the dispersing agent is an inorganic dispersing agent, such as sodium acid pyrophosphate.

It has been found that if the slurry contains more than about 85% by weight water, the water-swellable clay will not gel sufficiently to develop the properties necessary for the cement or grout composition to prevent the flow of salt-contaminated water in accordance with one embodiment of the present invention.

In accordance with one important embodiment of the present invention, one grout composition includes fine sodium bentonite particles having a particle size less than about 300 μm; preferably less than about 200 μm; and more preferably a powder, having a particle size of about 200 mesh or less (U.S. Sieve Series), or less than about 75 μm. In accordance with this embodiment of the present invention, the sodium bentonite particles, after the initial mining and drying, are rewetted, optionally with an aqueous solution of a water-soluble polymer, such that the sodium bentonite has a moisture content above about 12% by weight, based on the dry weight of the sodium bentonite clay, preferably about 15% to about 45% moisture; and then the clay is extruded; and then dried to a moisture content of about 12% by weight or less. Such rewetted, redried, clay then is ground to any desired particle size distribution for the grout of the present invention, or for other purposes disclosed in the parent patent application, (Serial No. 08/128,598, filed Sep. 29, 1993, hereby incorporated by reference) while forming fine particles (<300 mesh, particularly less than about 75 μm) as a by-product. Surprisingly, these by-product fines are useful in the grout composition of the present invention in an amount of about 1% to about 100% of the water-swellable sodium bentonite clay, particularly where the fine sodium bentonite particles have been impregnated with a water-soluble polymer, as disclosed in the parent patent application. Alternatively, sodium bentonite fines (not previously polymer-impregnated) can be dry blended with calcium bentonite, water-soluble polymer and a dispersing agent, e.g., SAPP, and rewetted to about 15% to about 45% moisture, prior to being extruded and ground to a desired particle size distribution.

The grout composition of the present invention includes sodium bentonite clay. A water-soluble polymer is another essential component, in order to make the grout composition effective for sealing in environments where the grout must retain its seal or water barrier property while in contact with water that is contaminated with water-soluble metal salts, or organic liquids. Untreated, water-swellable sodium bentonite clay loses much of its water absorbency and swellability if the water absorbed is contaminated with water-soluble metal salts of alkali metals or alkaline earth metals, particularly sulfate or halide salts, such as sodium chloride, magnesium chloride, calcium bromide, calcium chloride, potassium chloride, salt-containing body fluids, organic liquids, e.g., phenol, and the like. The water-soluble polymer can be impregnated into the sodium bentonite clay, and optionally also impregnated into a calcium bentonite solids component, if used as the filler, or the polymer can be added separately to the water in the grout composition. In either case, some of the dissolved, water-soluble polymer will be absorbed by the sodium bentonite (and calcium bentonite, if included) to increase the capacity of the sodium bentonite (and calcium bentonite, if included) to absorb the contaminated water and permit the sodium bentonite component to swell sufficiently for sealing or stabilizing an earthen formation, e.g., a trench wall, or to cement a conduit to a surrounding earthen formation, to prevent fluid loss from the well, where the earthen formation contains contaminated water in fluid communication with the well bore or trench wall. The water-soluble polymer should be included in the grout composition in an amount of about 0.01% to about 10% based on the weight of the bentonite clay components, for increasing the absorbency of the bentonite clays for contaminated water, and to allow the sodium bentonite clay to swell sufficiently for sealing the earthen formation. Once the slurry mixture is prepared in accordance with the present invention and the grout composition is set and cured in place, it not only resists degradation from contaminants that come into contact with its perimeter borders, but it is also able to maintain its sealant qualities even with contaminated fluids permeating through it.

The components of the grout composition of the present invention can be dry blended together and added to water together; or the components can be added separately to water to form a settable grout composition. In either case, the water-insoluble solids components comprise about 15% to about 75% by weight of the composition, together with about 25% to about 85% by weight water, based on the total weight of the composition. The preferred water-insoluble solids content for the grout composition is about 20% to about 30% by weight solids (about 70% to about 80% by weight water), more preferably about 25% solids. At the lower solids levels, e.g., about 15% to about 20% water-insoluble solids, the composition should include about 75% to about 100% water-swellable sodium bentonite clay based on the total weight of water-insoluble solids in the composition. At the higher solids contents, e.g., $20^+$% to about 75% by weight solids, the composition should include at least about 25% water-swellable sodium bentonite (about 25% to about 100% by weight water-swellable sodium bentonite), based on the total weight of water-insoluble solids in the composition. In all compositions, a water-soluble polymer is included in the composition in an amount of about 0.01% to about 10% by weight, based on the total weight of bentonite clay components in the composition, preferably about 0.03% to about 5% by weight of bentonite clay components, more preferably about 0.05% to about 3% by weight of bentonite clay components, for sealing against contaminated water.

The water-insoluble solids of the grout composition comprise water-swellable sodium bentonite clay, alone, or together with an optional filler, preferably calcium bentonite clay. The water-swellable sodium bentonite clay can be natural water-swellable sodium bentonite clay, or can be another form of bentonite clay, e.g., calcium bentonite, that has been ion-exchanged to increase the exchangeable sodium ion content sufficiently that the bentonite, after ion-exchange, has sodium as its predominant exchangeable cation.

The preferred method of improving the contaminated water absorption ability of smectite clays, preferably a water-swellable smectite clay, such as sodium bentonite, for use in the grout compositions of the present invention, includes the steps of drying the mined water-swellable clay, homogeneously mixing the dried clay with a water-soluble polymer, then rewetting the clay and polymer with water and a dispersing agent, such as sodium acid pyrophosphate (SAPP), to impregnate the clay with the water-dissolved polymer, optionally extruding the impregnated, rewetted clay, and then redrying the clay. The processed, rewetted, polymer-impregnated, and redried water-swellable clay is unexpectedly better for use in a contaminated water-contacting grout composition.

In accordance with the preferred embodiment of the present invention, the mined and dried sodium bentonite clay is homogeneously mixed with particles of a water-soluble polymer, and the clay and polymer, preferably also a dispersing agent, e.g., SAPP, are then intimately mixed with water to dissolve the polymer and impregnate the clay with water and dissolved polymer. It should be understood, however, that the water-soluble polymer can be dissolved in water to form a solution of polymer that is subsequently used to impregnate and rewet the clay. However, while it is possible to hydrate a clay with a solution of water and water-soluble polymer, there are some disadvantages or inconveniences with this method. If more water is used in the rewetting and polymer-impregnating step, more water must be driven off in the redrying step. Advantageously, a relatively small quantity of water is used to rehydrate the clay and to impregnate the clay with dissolved polymer. Just enough water to effectively rewet the clay is insufficient to totally dissolve the polymer, producing a lumpy solution. By first mixing the polymer with the clay, together with any optional additives, such as a dispersing agent, e.g., SAPP, water can be easily sprayed or poured into the clay mixture. Also, dry clay and chemical additives are easier to measure and mix than polymer and water. With this method, there would not be problems with thick, sticky, lumpy polymer clogging up the sprayers or water applicators. Because the dry clay, polymer, and any optional chemical additives would already be pre-measured and premixed, adding too much or too little water would not result in either over or under polymer treatment. Adding water to an already prepared mixture of dry clay, polymer, and any optional chemical additives would be more efficient for plant operation.

In accordance with the preferred embodiment, the clay is rewetted and the polymer dissolved using non-contaminated, e.g., fresh water, and a dispersing agent, e.g., SAPP, to a water content of at least about 15%, based on the dry weight of the clay, and the polymer-impregnated clay is then redried to a water content of about 12% or less, based on the dry weight of the clay, prior to or after grinding. The improvement in clay properties for use in contact with contaminated water is achieved in accordance with the present invention regardless of the method used for wetting, polymer impregnation, drying, and grinding the clay so long as the dried water-swellable clay, having a moisture content of about 12% or less, is rewetted and impregnated with dissolved polymer in an amount sufficient to impregnate the clay with at least about 1% by weight polymer, preferably about 1% to about 2% by weight polymer based on the dry weight of the clay, and sufficient water to rehydrate the clay to a water content of more than about 12% by weight, preferably at least about 15% by weight, up to about 45% by weight water, based on the dry Weight of the clay. More preferably, the clay is rewetted to a water content of at least about 18%, up to about 100% by weight, based on the dry weight of the clay, and thereafter extruded before being redried to a water content of about 12% or less, based on the dry weight of the clay.

In accordance with the preferred embodiment of the present invention, a dispersing agent is included with the water-soluble polymer to achieve more even and homogeneous impregnation of the polymer, upon solubilization, into the entire mass of the smectite clay(s) being treated. While the dispersing/thinning agent is not essential to achieve the advantages of the present invention, the thinning of a slurry enables the clay platelets to form a more compact sealant layer. The SAPP does not really help the polymer to impregnate the clay as much as the rewetting and extruding does.

Rewetting and extruding the clay with polymer and the dispersing/thinning agent, e.g., SAPP, helps the end product since SAPP impregnated into the clay aids in thinning and better dispersing the clay after being impregnated into the clay with the polymer. The preferred dispersing/thinning agent is sodium acid pyrophosphate (SAPP). Other suitable dispersing agents include tetra sodium pyrophosphate; sodium meta phosphate; sodium tetra phosphate; tannic acid; sodium tannate; soda ash; caustic soda; calcium lignosulfonate; mined lignins and modified chrome lignosulfonates. The dispersing agent is included in the grout composition in an amount of 0% to about 15%, based on the dry weight of the water-insoluble solids in the composition, preferably about 1% to about 10% by weight of water-insoluble solids.

The preferred rehydration methods are outlined as follows:

PLANT PRODUCTION METHOD FOR THE CONTAMINANT RESISTANT CLAY (1) Dry blend powdered sodium bentonite with water-soluble polymer and SAPP in the proper proportions.

(2) Feed the treated powdered mixture into a pug mill.

(3) Water is sprayed onto the powdered mixture as it passes through the pug mill (at a rate to bring the moisture of the mixture up to 15%–45% by weight).

(4) The hydrated material then passes through an extruder and comes out as noodles.

(5) The extruded noodles are then dried down to less than 10% moisture (by weight).

(6) The dried noodles are then reduced to produce both granular (if desired) and fines (usually less than 50 mesh).

SINGLE REHYDRATION POLYMER TREAT METHOD (1) Start with a dried crude untreated sodium bentonite base clay.

(2) Reduce this base clay to a powder by grinding it to pass 0.5 mm grinder mesh screen.

(3) Weigh out a portion of this powdered base clay.

(4) To the weighed powdered clay, add the proper amounts of polymer and SAPP[1]. Depending on the application of the resultant clay, SAPP may be deleted, changed to another dispersant, or another chemical additive (with a different purpose) may be substituted.

[1]Sodium acid pyrophosphate.

(5) Place the powdered clay mixture into a Kitchen Aid Mixer bowl. (At the plant, a "Pug Mill" would be used for the mixing.)

(6) Place the mixing bowl into the Kitchen Aid mixer and install the "beater" mixing attachment.

(7) Start the rotary mixing on the lowest setting.

(8) While rotary mixing (still on the lowest speed), slowly add enough water to bring the moisture of the mixture up to about 35%[2]. (Prior to this step, the moisture content of the clay had to have been determined in order to calculate the amount of water needed.)

[2]The amount of water used for the most effective rehydration will vary with the water-absorption properties of the base clay. Less water-absorbent clays, e.g., calcium bentonite, should be wetted with more water, e.g., 40–60% $H_2O$ for best polymer impregnation.

(9) After the measured water has been added, keep mixing (still on lowest speed for a minimum of 5 minutes. If mixture is still not consistent, continue mixing. (At the plant, the mixing should be continued until the mixture is evenly wetted and consistent.)

(10) After mixing, transfer the wetted mixture into a closed container or a plastic bag. (At the plant, a tarp or plastic sheet could be used to cover the mixture.)

(11) Allow mixture to hydrate for minimum of two days.[3]

(12) Dry the clay mixture to 7–10% moisture content.

(13) Granulate the mixture.

[3]Aging is not essential, particularly if the mixture is extruded and pug milled, as at a commercial plant.

DOUBLE REHYDRATION POLYMER TEAT METHOD (1) Weigh out a portion of dried crude sodium bentonite clay.

(2) Add the proper amounts of polymer to the weighed clay.

(3) Add water to the clay-polymer mixture equivalent to about 75%–100% of the clay weight. (If the clay weight is 1000 grams, then add 1000 grams or mls of water.) Stir the mixture while adding the water to ensure even distribution of the water.

(4) Cover the wetted mixture or transfer into a sealed container or plastic bag.

(5) Allow wetted clay mixture to hydrate for minimum of two days.

(6) Dry the clay mixture to about 7% moisture content.

(7) Add to the dried clay mixture the same amount of water as used in the first rehydration. Do not add any more polymer in this step.

(8) Allow the clay mixture to hydrate for minimum of two days. (9) Dry the clay mixture to 7–10% moisture content.

(10) To the granulated sample, add 10 pounds per ton of SAPP and an additional 5 lb./ton of polymer. Depending on the application of the resultant clay, SAPP may be deleted, changed to another dispersant, or another chemical additive (with a different purpose) may be substituted.

(11) Mix sample completely.

The Kitchen Aid mixer was used because it simulates the mixing action of a Pug Mill at the plant. With the single rehydration technique, the untreated base clay should be in powdered form. Because the least amount of water necessary for polymer impregnation preferably is used to rehydrate the clay, it would be easier for smaller, powdered clay particles to absorb the dissolved polymer during the rehydration stage.

The single rehydration procedure was preformed on sodium bentonite base clays using "ALCOMER 228" polymer and SAPP. Fluid loss tests were run on this sample (W-16F) using both deionized (DI) water and 1000 ppm $CaCl_2$. The results showed not only low filtrate values, but virtually no difference between the DI water filtrates and the calcium-contaminated water filtrates. The values for this sample were relatively low and showed that the calcium contamination did not appear to really effect the fluid loss characteristics of the sample.

The following data in Table I show that the polymer-impregnated sodium bentonite clay produced using the process of the present invention, using the polymer-impregnation, rehydration process, is resistant to a wide variety of contaminants, including dissolved inorganic salts, and organic liquids.

TOP LOADING FILTER PRESS TEST (LSK Method)

(1) Place about 1 tablespoon of dried granular sample to be tested in a small cup or container. Add enough deionized water to sample and stir to make a paste. Age this paste for at least 1–2 hours.

(2) Apply a layer of the sample paste to the lower inner wall of the cylinder portion of the filter press cell.

(3) Allow the paste layer to dry.

(4) Assemble the top loading filter press cell with the filter paper. Use caution so that the dried inner paste layer is not cracked or damaged while assembling cell.

(5) Weigh out 12.0 grams of dried granular sample.

(6) Sprinkle sample into the cell so that it evenly covers the bottom.

(7) Place another filter paper on top of sample.

(8) Evenly pour 50 grams of sand onto the filter paper.

(9) Place another filter paper on top of sand.

(10) Place cell into the mount and tighten the top cap lid down using the mount.

(11) Using a funnel, carefully pour 60–70 mls of prehydration solution into the cell through the small screw cap opening in the top cap lid.

(12) Allow sample to hydrate for a minimum of 16 hours.

(13) Prepare testing solution.

(14) Add a luminous dye to the testing solution and stir.

(15) Through the small screw cap opening, pour about 200 mls of dyed testing solution onto the hydrated sample (using a funnel).

(16) Seal the top cap lid by tightening the small screw cap onto the opening. Use TEFLON tape around the screw cap to ensure a hermetic seal.

(17) Connect the Filter Press cell to the compressed air tank.

(18) Weigh out the filtrates at regularly timed intervals (e.g., 30 minutes). If a severely contaminated testing solution is used, shorter time intervals may be desired.

(19) Keep test running for 6–7 hours nonstop.

(20) Depending on the purpose and application of the test, if there is still no sign of the dyed testing solution in the filtrates after 6–7 hours (and if the filtrate values are consistently low and steady), lower the pressure to about 60 psi and keep the test running to the next day(s).

(21) Place a large enough container underneath the cell to accommodate the 200 mls of testing solution, should the sample completely fail during the night. Tare this container prior to using.

(22) Cover the entire filter press assembly with a plastic sheet to help prevent any splattering if there should be a break in the seal.

(23) In the morning, weigh the accumulated overnight filtrates and observe any dyed testing solution in the filtrates.

(24) Raise pressure back up to 100 psi and continue to weigh the timed interval filtrates until the desired test termination.

The purpose of lining the lower inside of the cell with paste is to help prevent side-wall leakage in the cell. The reason for allowing the paste to dry is to minimize the dry sample from adhering to the paste layer. (We do not wish to lose any sample to the side walls.) This paste should be made from the sample to be tested-the paste from one sample should not be used for other different samples.

The reason for adding the dye to the testing solution is to see when and if the testing solution completely penetrates the sample layer. The first several sets of filtrates will probably be prehydration solution and will therefore be colorless. When the dye appears, this means that the testing solution has penetrated the sample layer. Therefore, special attention should be directed at the subsequent filtrate weights to observe the penetration of the testing solution through the sample. If the dye appears in the very first filtrates, then either the sample failed immediately when exposed to the testing solution, or there was a break in the sample cake seal. In most of these cases, a leak or break in the sample cake is the cause of the immediate appearance of the dyed testing solution. Another advantage of using dyed testing solution is that it can be used to indicate where in the sample cake did the testing solution completely penetrate. Luminous dye is preferred over other dyes because it will not be absorbed by the clay sample, nor react with it, as well as not interfere with the testing solutions.

The purpose of adding a sand layer on top of the hydrated sample is to prevent the dry sample from being disturbed during the addition of the prehydration solution. This sand layer also helps to keep the hydrated sample cake intact during the addition of the testing solution.

If the purpose of the test is to test the clay sample in contact with a certain testing solution (as it is in most cases) and there is still no sign of the dyed testing solution after the first 614 7 hours, then the test should be kept running overnight. Only if the filtrates are consistently low and stable should the overnight run be attempted. If the filtrates are very high, the sample will probably fail overnight and all testing solution will come out. When this happens, the sample cake will dry out and all of the compressed air from the cylinder tank will completely bleed out. Since there is no one to watch the cells overnight, the pressure is lowered to help prevent seal breakage. The reason why the pressure is not completely released from the cell is to prevent the sample cake from reswelling up, as well as prevent the sample cake from being disturbed by the pressure change.

This LSK test is NOT a permeability test. It is basically an accelerated filter press procedure to test the flow of test solution through a clay sample. The test results may pattern the permeability tests in testing the ability of a sample to prevent a testing solution from passing through it. However, the way the filter press test is prepared and run, the filtrate values cannot be substituted in any of the known permeameter equations for hydraulic conductivity values. The LSK test differs from the Triax and Rigid Wall permeameters, mainly, in that 100 psi of compressed air is used to force the testing solution (or permeant) through the sample cake and therefore accelerate the results.

The dry and rehydrated samples were tested using a number of contaminants and comparing dry clay plus polymer to rehydrated (polymer impregnated and redried) samples in some cases. The following five polymer-treated sodium bentonite base clays were used for the testing:

| SAMPLE NAME | DESCRIPTION |
|---|---|
| B1 @ 10 | Granular dry base clay #1, 10 lb./ton Cypan Polymer, and 10 lb./ton of SAPP. Sieved of fines. |
| A1 @ 10 | Granular dry base clay #4, 10 lb./ton of Cypan polymer, and 10 lb./ton of SAPP. This sample has fines. |
| C1 @ 10 | Granular dry base clay #5, 10 lb./ton of Cypan polymer, and 10 lb./ton of SAPP. |
| D1 @ 10 | Granular dry base clay #3, 10 lb./ton of Cypan, and 10 lb./ton of SAPP. |
| U-1B | Dry base clay #4 rehydrated with 10 lb./ton of Cypan polymer using Double Rehydration method. 10 lb./ton of SAPP and additional 5 lb./ton of Cypan added. |
| W-1B | Dry base clay #5 rehydrated with 10 lb./ton of Cypan polymer using Double Rehydration Method. 10 lb./ton of SAPP and additional 5 lb./ton of Cypan added. |
| X-1B | Dry base clay #3 rehydrated with 10 lb./ton of Cypan polymer using Double Rehydration Method. 10 lb./ton of SAPP and additional 5 lb./ton of Cypan added. |
| A16-25 @ 10 | Granular dry base clay #4, 25 lb./ton of "ALCOMER 228" polymer, and 10 lb./ton of SAPP. |
| C16-25 @ 10 | Granular dry base clay #5, 25 lb./ton of "ALCOMER 228" polymer, and 10 lb./ton of SAPP. |
| D16-25 @ 10 | Granular dry base clay #3, 25 lb./ton of "ALCOMER 228" polymer, and 10 lb./ton of SAPP. |
| U-16B | Dry base clay #4 rehydrated with 25 lb./ton of "ALCOMER 228" using Double Rehydration Method. 10 lb./ton of SAPP and additional 5 lb./ton of "ALCOMER 228" added. |
| W-16B | Dry base clay #5 rehydrated with 25 lb./ton of "ALCOMER 228" polymer using Double Rehydration Method. 10 lb./ton of SAPP and additional 5 lb./ton of "ALCOMER 228" added. |
| X-16B | Dry base clay #3 rehydrated with 25 lb./ton of "ALCOMER 228" polymer using Double Rehydration Method. 10 lb./ton of SAPP and additional 5 lb./ton of "ALCOMER 228" added. |
| W-16F | Dry base clay #5 rehydrated with 25 lb./ton of "ALCOMER 228" polymer and 10 lb./ton of SAPP using Single Rehydration Method. This sample has fines. |
| W-16F-S | Dry base clay #5 rehydrated with 25 lb./ton of "ALCOMER 228" polymer and 10 lb./ton of SAPP using Single Rehydration Method. This sample has NO fines. |
| P16-EL | Plant Production sample using dry powder bsae clay #5 with 25 lb./ton of "ALCOMER 228" and 10 lb./ton of SAPP. Rehydrated up to 25%–34% using Pug Mill and extruder-simulated Single Rehydration Method. |
| A10-10 @ 10 | Granular dry base clay #4 mixed with 10 lb./ton of "OFXC 1146" cationic polymer, and 10 lb./ton of SAPP. |
| A20-10 @ 10 | Granular dry base clay #4 mixed with 10 lb./ton of "JAGUAR 8920" cationic guar, and 10 lb./ton of SAPP. |
| A21-10 @ 10 | Granular dry base clay #4 mixed with 10 lb./ton of "JET JEL" nonionic guar, and 10 lb./ton of SAPP. |
| A22-25 @ 10 | Granular dry base clay #4 mixed with 25 lb./ton of Sigma CMC, and 10 lb./ton of SAPP. |
| U-10F | Dry powdered base clay #4 rehydrated with 10 lb./ton of "OFXC 1146" and 10 lb./ton of SAPP using Single Rehydration Method. |
| U-20F | Dry powdered base clay #4 rehydrated with 10 lb./ton of "JAGUAR 8920" and 10 lb./ton of SAPP using Single Rehydration Method. |
| U-21F | Dry powdered base clay #4 rehydrated with 10 lb./ton of "JET JEL" and 10 lb./ton of SAPP using Single Rehydration Method. |
| U-22F | Dry owdered base clay #4 rehydrated with 25 lb./ton of Sigma CMC and 10 lb./ton of SAPP using Single Rehydration Method. |
| U-23L | Dry granular base clay #4 rehydrated with 53.7 lb./ton of "PLURADYNE CA 135" and the amount of water equal to the weight of the clay used. |
| U-23M | Dry granular base clay #4 rehydrated with |

-continued

| SAMPLE NAME | DESCRIPTION |
|---|---|
| | 90.9 lb./ton of "PLURADYNE CA 135" and the amount of water equal to the weight of the clay used. |

The above table lists the various polymer impregnated and redried sodium bentonite samples tested and their formulations. The following Table shows API Fluid loss results using deionized water, aqueous inorganic salt solutions contaminated with KCl, NaCl or $CaCl_2$, and aqueous compositions containing an organic, $NH_4NO_3$, contaminant as the permeant. The following tables show the results with aqueous solutions contaminated with sea water salt, and various organic chemicals, specifically phenol, acetic acid, and acetone. The concentrations of the contaminants are also indicated in these Tables. Even with the organic contaminants shown in Table 8, the fluid loss values are still lower for the rehydrated samples, especially with the "ALCOMER 228" polymer impregnation. The weight average molecular weight of the "ALCOMER 228" polymer was found to be about 1,383,000.

| SAMPLE | FLUID LOSS API (mls) Deionized Water | FLUID LOSS API (mls) 1000 ppm $CaCl_2$ | FLUID LOSS API (mls) 1000 ppm $NH_4NO_3$ | FLUID LOSS API (mls) 1000 ppm KCl | FLUID LOSS API (mls) 1000 ppm NaCl |
|---|---|---|---|---|---|
| B1 @ 10 | 11.6 | 21.2 | 13.0 | 14.4 | 13.5 |
| A1 @ 10 | 10.7 | 16.5 | 13.8 | 14.0 | 14.2 |
| C1 @ 10 | 9.9 | 15.5 | — | — | — |
| D1 @ 10 | 8.8 | 12.5 | — | — | — |
| U-1B | 8.6 | 11.9 | 9.4 | 11.8 | 9.9 |
| W-1B | 8.6 | 10.3 | 8.6 | 10.2 | 8.7 |
| X-1B | 7.6 | 9.2 | 8.0 | 8.9 | 7.9 |
| A16-25 @ 10 | 9.4 | 10.2 | — | — | — |
| C16-25 @ 10 | 9.0 | 10.0 | — | — | — |
| D16-25 @ 10 | 7.5 | 8.5 | — | — | — |
| U-16B | 8.2 | 8.4 | 8.4 | 8.7 | 8.4 |
| W-16B | 7.7 | 7.8 | 7.8 | 8.2 | 7.8 |
| X-16B | 6.8 | 7.5 | 7.1 | 7.7 | 7.0 |
| W-16F | 8.2 | 8.2 | 8.3 | 8.5 | 8.4 |
| W-16F-S | 8.2 | 8.3 | — | 8.6 | 8.1 |
| P16-EL | 8.3 | 7.5 | 7.8 | 7.9 | 7.6 |
| C19-10 @ 10 | 11.6 | 17.1 | — | — | — |
| A3-10 @ 10 | 12.5 | 17.1 | — | — | — |
| A8-25 @ 10 | 10.5 | 10.3 | — | — | — |
| W-19F | 9.8 | 13.0 | — | — | — |
| U-3F | 11.0 | 13.5 | — | — | — |
| U-8F | 9.5 | 9.2 | — | — | — |

| SAMPLE | FLUID LOSS API (mls) 5000 ppm Sea Water Salt (dry) | FLUID LOSS API (mls) 10,000 ppm Sea Water Salt (dry) | FLUID LOSS API (mls) 1000 ppm Phenol | FLUID LOSS API (mls) 30,000 ppm Acetic Acid | FLUID LOSS API (mls) 10,000 ppm Acetone |
|---|---|---|---|---|---|
| B1 @ 10 | 20.2 | 40.1 | 11.8 | 18.8 | 11.7 |
| A1 @ 10 | 15.9 | 19.7 | 12.8 | 17.8 | 12.3 |
| C1 @ 10 | — | — | — | — | — |
| D1 @ 10 | — | — | — | — | — |
| U-1B | 11.1 | — | 9.2 | — | — |
| W-1B | 10.1 | 17.4 | 8.8 | 14.3 | 8.9 |
| X-1B | 8.9 | 16.7 | 7.9 | 28.8 | 7.7 |
| A16-25 @ 10 | — | — | — | — | — |
| C16-25 @ 10 | — | — | — | — | — |
| D16-25 @ 10 | — | — | — | — | — |
| U-16B | 8.2 | 12.2 | 8.6 | 9.5 | 8.1 |
| W-16B | 7.8 | 11.2 | 8.4 | 9.2 | 7.7 |
| X-16B | 7.0 | 10.8 | 7.1 | 15.6 | 6.7 |
| W-16F | 8.4 | 12.9 | 8.7 | 9.2 | 8.2 |
| W-16F-S | 8.2 | 12.7 | 8.5 | 9.2 | 8.2 |
| P16-EL | 7.3 | 12.1 | 8.3 | 8.7 | 8.2 |

The data in the following tables are Top Loading Filter Press results, showing the filtrate collected with time through various polymer-impregnated bentonite clay samples and various contaminated waters.

Below in Table II is a summary listing the flow rate values for the Top Loading Filter Press (LSK Method) tests shown in Table I. As can be seen, the flow rate values for the rehydrated samples are much lower than the "dry-mixed" samples.

TABLE II

Average FLOW RATE Values of Top Loading Filter Press Tests (LSK)

| SAMPLE | Average FLOW RATE (grams/hour) |
|---|---|
| Base clay #1 | 34.1 |
| B1 @ 10 | 7.7 |
| A1 @ 10 | 8.0 |
| U-1B | 5.2 |
| W-1B | 4.0 |
| X-1B | 1.0 |
| U-16B | 0.6 |

TABLE II-continued

Average FLOW RATE Values of Top Loading Filter Press Tests (LSK)

| SAMPLE | Average FLOW RATE (grams/hour) |
|---|---|
| W-16B | 0.6 |
| X-16B | 0.5 |
| W-16F | 0.5 |
| W-16F-S | 0.5 |
| P16-EL | 0.4 |

TABLE III

TOP-LOADING FILTER PRESS (LSK Method)
(Prehydrated with Tap Water/1% $CaCl_2$ Testing Solution)

| Cumulative Time (Hours) | Base Clay #1 Interval Filtrates (grams) | Base Clay #1 Cumul. Filtrates (grams) | B1 @ 10 Interval Filtrates (grams) | B1 @ 10 Cumul. Filtrates (grams) | A1 @ 10 Interval Filtrates (grams) | A1 @ 10 Cumul. Filtrates (grams) |
|---|---|---|---|---|---|---|
| 0.5 | 9.50 | 9.50 | 3.87 | 3.87 | 3.16 | 3.16 |
| 1 | 4.63 | 14.13 | — | — | 1.77 | 4.93 |
| 1.5 | 3.99 | 18.12 | 4.09 | 7.96 | 1.47 | 6.40 |
| 2 | 3.97 | 22.09 | 1.67 | 9.63 | 1.35 | 7.75 |
| 2.5 | 3.92 | 26.01 | 1.56 | 11.19 | 1.30 | 9.05 |
| 3 | 3.85 | 29.86 | 1.58 | 12.77 | 1.23 | 10.28 |
| 3.5 | 5.54 | 35.40 | — | — | 1.21 | 11.49 |
| 4 | 35.81 | 71.21 | 2.97 | 15.74 | 1.31 | 12.80 |
| 4.5 | — | — | 1.95 | 17.69 | 1.18 | 13.98 |
| 5 | 79.59 | 150.80 | 1.47 | 19.16 | — | — |
| 5.5 | 36.55 | 187.35 | 1.72 | 20.88 | 1.26 | 15.24 |
| 6 | discont. | discont. | 1.52 | 22.40 | 1.22 | 16.46 |
| 6.5 | | | 1.62 | 24.02 | 2.29 | 18.75 |
| 7 | | | 1.61 | 25.63 | 2.53 | 21.28 |
| 24 | | | 63.94 | 89.57 | 46.39 | 67.67 |
| 24.5 | | | 36.68 | 126.25 | 37.70 | 105.37 |
| 25 | | | 65.02 | 191.27 | 28.12 | 133.49 |
| 25.5 | | | discont. | discont. | 28.65 | 162.14 |
| 26 | | | | | 25.90 | 188.04 |
| 26.5 | | | | | 24.31 | 212.35 |
| Average flow rate (grams/hr.) | 34.1 | | 7.7 | | 8.0 | |

| Cumulative Time (Hours) | U-1B Interval Filtrates (grams) | U-1B Cumul. Filtrates (grams) | W-1B Interval Filtrates (grams) | W-1B Cumul. Filtrates (grams) | X-1B Interval Filtrates (grams) | X-1B Cumul. Filtrates (grams) |
|---|---|---|---|---|---|---|
| 0.50 | 1.38 | 1.38 | 1.07 | 1.07 | 1.49 | 1.49 |
| 1 | 0.96 | 2.34 | 0.89 | 1.96 | 0.93 | 2.42 |
| 1.5 | 0.90 | 3.24 | 0.80 | 2.76 | 0.65 | 3.07 |
| 2 | 0.79 | 4.03 | 0.69 | 3.45 | 0.35 | 3.80 |
| 2.5 | 0.73 | 4.76 | 0.65 | 4.10 | 0.64 | 4.44 |
| 3.5 | 1.22 | 5.98 | 1.24 | 5.34 | 1.20 | 5.64 |
| 4.5 | 1.16 | 7.14 | 1.03 | 6.37 | 0.99 | 6.63 |
| 5 | 0.67 | 7.91 | 0.56 | 6.93 | 0.52 | 7.15 |
| 5.5 | 0.61 | 8.42 | 0.56 | 7.49 | 0.49 | 7.64 |
| 6 | 0.64 | 9.06 | 0.56 | 8.05 | 0.51 | 8.15 |
| 6.5 | 0.63 | 9.69 | 0.55 | 8.60 | 0.48 | 8.63 |
| 7 | 0.64 | 10.33 | 0.55 | 9.15 | 0.50 | 9.13 |
| 7.5 | 0.61 | 10.94 | 0.52 | 9.67 | 0.46 | 9.59 |
| 24 | 21.17 | 32.11 | 14.59 | 24.26 | 11.73 | 21.32 |
| 24.5 | 3.51 | 35.62 | 1.33 | 25.59 | 0.67 | 21.99 |
| 25.5 | 7.84 | 43.46 | 4.25 | 29.84 | 1.20 | 23.19 |
| 26 | 5.86 | 49.32 | 2.71 | 32.55 | 0.58 | 23.77 |
| 26.5 | 7.73 | 57.05 | 2.95 | 35.50 | 0.60 | 24.37 |
| 27 | 8.58 | 65.63 | 2.89 | 38.39 | 0.55 | 24.90 |
| 27.5 | 9.95 | 75.58 | 3.95 | 42.34 | 0.61 | 25.53 |
| 28 | 10.61 | 86.19 | 8.40 | 50.74 | 0.60 | 26.13 |

TABLE III-continued

TOP-LOADING FILTER PRESS (LSK Method)
(Prehydrated with Tap Water/1% CaCl₂ Testing Solution)

| Cumulative Time (Hours) | Interval Filtrates (grams) | Cumul. Filtrates (grams) | Interval Filtrates (grams) | Cumul. Filtrates (grams) | Interval Filtrates (grams) | Cumul. Filtrates (grams) |
|---|---|---|---|---|---|---|
| 28.5 | 11.42 | 97.61 | 11.75 | 62.49 | 0.59 | 26.72 |
| 29 | 10.65 | 108.26 | 12.95 | 75.44 | 0.60 | 27.32 |
| 29.5 | 11.69 | 119.95 | 14.12 | 89.56 | 0.59 | 27.91 |
| 30 | 20.56 | 140.51 | 18.30 | 107.86 | 0.76 | 28.67 |
| 30.5 | 19.40 | 159.91 | 13.19 | 121.05 | 0.51 | 29.18 |
| Average flow rate (grams/hr.) | 5.2 | | 4.0 | | 1.0 | |

| | U-16B | | W-16B | | X-16B | |
|---|---|---|---|---|---|---|
| Cumulative Time (Hours) | Interval Filtrates (grams) | Cumul. Filtrates (grams) | Interval Filtrates (grams) | Cumul. Filtrates (grams) | Interval Filtrates (grams) | Cumul. Filtrates (grams) |
| 0.5 | 1.64 | 1.64 | — | — | — | — |
| 1 | 0.96 | 2.5 | 0.44 | 0.44 | 0.32 | 0.32 |
| 1.5 | 0.64 | 3.14 | 0.52 | 0.96 | 0.51 | 0.83 |
| 2 | 0.55 | 3.69 | 0.47 | 1.43 | 0.45 | 1.28 |
| 2.5 | 0.50 | 4.19 | — | — | — | — |
| 3 | — | — | — | — | — | — |
| 3.5 | — | — | 1.43 | 2.86 | 1.36 | 2.64 |
| 4 | 1.27 | 5.46 | 0.39 | 3.25 | 0.40 | 3.04 |
| 4.5 | 0.44 | 5.90 | 0.37 | 3.62 | 0.36 | 3.40 |
| 5 | 0.42 | 6.32 | 0.39 | 4.01 | 0.39 | 3.79 |
| 5.5 | 0.41 | 6.73 | 0.38 | 4.39 | 0.37 | 4.16 |
| 6 | 0.39 | 7.12 | 0.39 | 4.78 | 0.37 | 4.53 |
| 6.5 | 0.37 | 7.49 | 0.34 | 5.12 | 0.34 | 4.87 |
| 24 | 7.65 | 15.14 | 7.47 | 12.59 | 6.25 | 11.12 |
| 24.5 | 0.54 | 15.68 | 0.50 | 13.09 | 0.45 | 11.57 |
| 25 | — | — | 0.41 | 13.50 | 0.33 | 11.90 |
| 25.5 | 0.75 | 16.43 | 0.40 | 13.90 | 0.32 | 12.22 |
| 26 | 0.36 | 16.79 | 0.39 | 14.29 | 0.30 | 12.52 |
| 26.5 | 0.35 | 17.14 | 0.44 | 14.73 | 0.36 | 12.88 |
| 27 | 0.36 | 17.50 | 0.33 | 15.06 | 0.28 | 13.16 |
| 27.5 | — | — | 0.39 | 15.45 | 0.29 | 13.45 |
| 28 | 0.67 | 18.17 | — | — | — | — |
| 28.5 | 0.46 | 18.63 | — | — | — | — |
| 29 | 0.33 | 18.96 | 1.05 | 16.50 | 0.85 | 14.30 |
| 29.5 | 0.43 | 19.39 | 0.40 | 16.90 | 0.29 | 14.59 |
| 30 | 0.34 | 19.73 | 0.38 | 17.28 | 0.28 | 14.87 |
| 30.5 | 0.36 | 20.09 | — | — | — | — |
| 31 | 0.33 | 20.42 | 0.76 | 18.04 | 0.57 | 15.44 |
| 31.5 | — | — | 0.35 | 18.39 | 0.25 | 15.69 |
| 48 | 7.03 | 27.45 | 7.63 | 26.02 | 5.80 | 21.49 |
| 48.5 | 0.50 | 27.95 | 0.50 | 26.52 | 0.38 | 21.87 |
| 49 | 0.44 | 28.39 | 0.43 | 26.95 | 0.33 | 22.20 |
| 49.5 | 0.41 | 28.80 | 0.43 | 27.38 | 0.35 | 22.55 |
| 50 | 0.45 | 29.25 | 0.57 | 27.95 | 0.29 | 22.84 |
| 50.5 | 0.41 | 29.66 | 0.93 | 28.88 | 0.33 | 23.17 |
| 51 | 0.44 | 30.10 | 0.53 | 29.41 | 0.32 | 23.49 |
| 51.5 | 0.44 | 30.54 | 0.53 | 29.94 | 0.33 | 23.82 |
| 52.5 | 0.81 | 31.35 | — | — | — | — |
| 53 | 0.46 | 31.81 | — | — | — | — |
| 54 | — | — | 2.36 | 32.36 | 1.40 | 25.22 |
| 54.5 | — | — | 0.55 | 32.85 | 0.36 | 25.58 |
| 55 | 1.57 | 33.38 | — | — | — | — |
| 55.5 | 0.41 | 33.79 | — | — | — | — |
| Average flow rate (grams/hr.) | 0.6 | | 0.6 | | 0.5 | |

| | W-16F | | W-16F-S | | P16-EL | |
|---|---|---|---|---|---|---|
| Cumulative Time (Hours) | Interval Filtrates (grams) | Cumul. Filtrates (grams) | Interval Filtrates (grams) | Cumul. Filtrates (grams) | Interval Filtrates (grams) | Cumul. Filtrates (grams) |
| 0.5 | 0.12 | 0.12 | 0.93 | 0.93 | 0.11 | 0.11 |
| 1 | 0.52 | 0.64 | 0.69 | 1.62 | — | — |
| 1.5 | 0.39 | 1.03 | 0.63 | 2.25 | 0.69 | 0.80 |
| 2 | — | — | — | 0.27 | 1.07 | |
| 2.5 | — | — | — | — | 0.21 | 1.28 |
| 3 | — | — | — | — | 0.22 | 1.50 |
| 3.5 | 1.41 | 2.44 | 1.47 | 3.72 | — | — |
| 4 | 0.34 | 2.78 | 0.39 | 4.11 | 0.45 | 1.95 |

TABLE III-continued

TOP-LOADING FILTER PRESS (LSK Method)
(Prehydrated with Tap Water/1% CaCl$_2$ Testing Solution)

| | | | | | | |
|---|---|---|---|---|---|---|
| 4.5 | — | — | — | — | 0.28 | 2.23 |
| 5 | 0.68 | 3.46 | 0.65 | 4.76 | 0.18 | 2.41 |
| 5.5 | 0.30 | 3.76 | 0.24 | 5.00 | 0.26 | 2.67 |
| 5 | 0.32 | 4.08 | 0.34 | 5.34 | 0.20 | 2.87 |
| 6.5 | 0.29 | 4.37 | 0.32 | 5.66 | 0.21 | 3.08 |
| 7 | — | — | — | — | 0.22 | 3.30 |
| 24 | 5.89 | 10.26 | 5.93 | 11.59 | 4.36 | 7.66 |
| 24.5 | 0.44 | 10.70 | 0.51 | 12.10 | 0.39 | 8.05 |
| 25 | 0.32 | 11.02 | 0.44 | 12.54 | 0.24 | 8.29 |
| 25.5 | 0.37 | 11.39 | 0.40 | 12.94 | 0.22 | 8.51 |
| 26 | 0.30 | 11.69 | 0.33 | 13.27 | 0.25 | 8.76 |
| 26.5 | — | — | — | — | 0.23 | 8.99 |
| 27 | 0.54 | 12.23 | 0.52 | 13.79 | 0.20 | 9.19 |
| 27.5 | — | — | — | — | 0.24 | 9.43 |
| 28.5 | 1.28 | 13.51 | 1.32 | 15.11 | — | — |
| 29 | 0.25 | 13.76 | 0.33 | 15.44 | 0.43 | 9.86 |
| 29.5 | 0.30 | 14.06 | 0.23 | 15.67 | 0.28 | 10.14 |
| 30 | 0.32 | 14.38 | 0.33 | 16.00 | — | — |
| 30.5 | 0.30 | 14.68 | 0.34 | 16.34 | — | — |
| 31 | 0.25 | 14.93 | 0.29 | 16.63 | 0.78 | 10.92 |
| 31.5 | — | — | — | — | 0.23 | 11.15 |
| 48 | 6.38 | 21.31 | 6.11 | 22.74 | 5.44 | 16.59 |
| 48.5 | 0.42 | 21.73 | 0.44 | 23.18 | 0.35 | 16.94 |
| 49 | 0.33 | 22.06 | 0.40 | 23.58 | 0.24 | 17.18 |
| 49.5 | 0.35 | 22.41 | 0.23 | 23.81 | — | — |
| 50 | 0.32 | 22.73 | 0.33 | 24.14 | 0.52 | 17.70 |
| 50.5 | 0.32 | 23.05 | 0.36 | 24.50 | 0.22 | 17.92 |
| 51 | 0.32 | 23.37 | 0.19 | 24.69 | 0.32 | 18.24 |
| 51.5 | 0.31 | 23.68 | 0.37 | 25.06 | 0.26 | 18.50 |
| 52.5 | 0.58 | 24.26 | 0.51 | 25.57 | — | — |
| 53 | 0.48 | 24.74 | 0.47 | 26.04 | 0.61 | 19.11 |
| 53.5 | 0.35 | 25.09 | 0.35 | 26.39 | 0.21 | 19.32 |
| 54 | 0.27 | 25.36 | 0.28 | 26.67 | — | — |
| 54.5 | — | — | — | — | 0.43 | 19.75 |
| 55 | — | — | — | 0.18 | 19.93 | |
| 55.5 | — | — | — | — | 0.17 | 20.10 |
| Average flow rate (grams/hr.) | 0.5 | | 0.5 | | 0.4 | |

The results from the Top Loading Filter Press test (LSK) show favorably lower filtrate values for all of the rehydrated samples (U-1B, W-1B, X-1B, U-16B, W-16B, X-16B, W-16F, W-16F-S, and P16-EL) versus the "dry mixed" samples (B1 @ 10 and A1 @ 10) as shown in the following flow rate summary Table IV. The rehydrated samples were unexpectedly more resistant to the calcium contamination than the dry-mixed samples. However, the samples that were rehydrated with the "ALCOMER 228" polymer produced even lower filtrate values than the rehydrated "CYPAN" samples. These results tend to parallel the API Fluid Loss results.

TABLE IV

Average FLOW RATE Values of Top Loading Filter Press Tests (LSK)

| SAMPLE | Average FLOW RATE (grams/hour) |
|---|---|
| Base clay #1 | 34.1 |
| B1 @ 10 | 7.7 |
| A1 @ 10 | 8.0 |
| U-1B | 5.2 |
| W-1B | 4.0 |
| X-1B | 1.0 |
| U-16B | 0.6 |
| W-16B | 0.6 |
| X-16B | 0.5 |
| W-16F | 0.5 |
| W-16F-S | 0.5 |
| P16-EL | 0.4 |

A sample of ocean water was obtained from Hawaii (R93-720). The conductivity of this Hawaii ocean water was 356,000 micro mhos and the pH was 8.2. Comparative Top Loading Filter Press Tests (LSK Method) were performed using this ocean water as the testing solution. The results are shown in Table V.

As can be seen in Table V, the P16-EL sample was much more able to withstand the chemical attack from the Hawaii ocean water sample than the "dry-mixed" sample. The B1 @ 10 sample lasted only 24.5 hours before the sample failed and all of the testing solution leaked through. The contaminant resistant P16-EL sample was able to last over four times longer and could have lasted even longer if the test were extended. The test indicates that the polymer rehydration process produces a smectite clay product that is highly resistant to NaCl-contaminated ocean water.

TABLE V

TOP-LOADING FILTER PRESS (LSK Method)
(Prehydrated with Tap Water/Hawaii Ocean Water as Testing Solution)

| Cumulative Time (Hours) | B1 @ 10 Interval Filtrates (grams) | B1 @ 10 Cumulative Filtrates (grams) | P16-EL Interval Filtrates (grams) | P16-EL Cumulative Filtrates (grams) |
|---|---|---|---|---|
| 0.5 | 4.12 | 4.12 | 0.18 | 0.18 |
| 1 | 2.02 | 6.02 | 0.56 | 0.74 |
| 1.5 | 1.63 | 7.77 | 0.34 | 1.08 |
| 2 | 1.46 | 9.23 | 0.40 | 1.48 |
| 2.5 | 1.44 | 10.67 | 0.30 | 1.78 |
| 3 | 1.50 | 12.17 | 0.35 | 2.13 |
| 3.5 | 1.41 | 13.58 | 0.32 | 2.45 |
| 4 | 1.37 | 14.95 | 0.17 | 2.62 |
| 4.5 | 1.40 | 16.35 | 0.27 | 2.89 |
| 5 | 1.39 | 17.74 | 0.28 | 3.17 |
| 5.5 | 1.74 | 19.48 | 0.33 | 3.50 |
| 6.5 | 4.12 | 23.60 | 0.41 | 3.91 |
| 24 | 46.73 | 70.33 | 3.62 | 7.53 |
| 24.5 | 121.27 | 191.60 | 0.29 | 7.82 |
| 25 | Ended | Ended | 0.18 | 8.00 |
| 25.5 | | | 0.11 | 8.11 |
| 26 | | | 0.22 | 8.33 |
| 26.5 | | | 0.22 | 8.55 |
| 27 | | | 0.21 | 8.76 |
| 28.5 | | | 0.47 | 9.23 |
| 29 | | | 0.20 | 9.43 |
| 29.5 | | | 0.15 | 9.58 |
| 30 | | | 0.08 | 9.66 |
| 30.5 | | | 0.17 | 9.83 |
| 31 | | | 0.14 | 9.97 |
| 32 | | | 0.37 | 10.34 |
| 48 | | | 3.16 | 13.50 |
| 48.5 | | | 0.24 | 1.74 |
| 49 | | | 0.19 | 13.93 |
| 49.5 | | | 0.17 | 14.10 |
| 50 | | | 0.14 | 14.24 |
| 50.5 | | | 0.16 | 14.40 |
| 51 | | | 0.07 | 14.47 |
| 51.5 | | | 0.10 | 14.57 |
| 53.5 | | | 0.68 | 15.25 |
| 54 | | | 0.16 | 15.41 |
| 54.5 | | | 0.16 | 15.57 |
| 55 | | | 0.04 | 15.61 |
| 55.5 | | | 0.18 | 15.79 |
| 72 | | | 2.95 | 18.74 |
| 72.5 | | | 0.08 | 18.82 |
| 73 | | | 0.11 | 18.93 |
| 73.5 | | | 0.15 | 19.08 |
| 74 | | | 0.20 | 19.28 |
| 74.5 | | | 0.18 | 19.46 |
| 75 | | | 0.16 | 19.62 |
| 75.5 | | | 0.18 | 19.80 |
| 76 | | | 0.16 | 19.96 |
| 76.5 | | | 0.05 | 20.01 |
| 77 | | | 0.17 | 20.18 |
| 77.5 | | | 0.21 | 20.39 |
| 79 | | | 0.46 | 20.85 |
| 79.5 | | | 0.18 | 21.03 |
| 80 | | | 0.06 | 21.09 |
| 96 | | | 2.91 | 24.00 |
| 103 | | | 2.11 | 26.11 |
| Average flow rate (grams/hr.) | 7.8 | | 0.25 | |

Other polymers and fluid loss agents were tested to determine if any particular ionic charge is essential for the water-soluble impregnated polymer to aid the smectite, e.g., sodium bentonite, clay in absorbing contaminated water when the dissolved polymer is impregnated into the clay, to rewet the clay, and the clay then is redried and included in a grout composition in accordance with the present invention.

The additional polymers and fluid loss agents tested were "MAGNIFLOC 903N" (a nonionic polyacrylamide) from American Cyanamid Co., "JAGUAR CDP" (an anionic guar gum) from Rhone-Poulenc, and "MON PAC ULTRA LOW" (a sodium carboxymethyl cellulose or CMC) from Montello, as shown in Table VI. As with the previous polymers, samples were prepared using both the "dry" method (untreated dried granular sodium bentonite base clay, dry polymer, and dry SAPP) and the Rehydration Method preferred for polymer impregnating the sodium bentonite clay component of the grout compositions of the present invention. As can be seen in Tables VII and VIII, the rehydrated samples showed unexpectedly lower fluid loss values than their "dry" counterparts. This proves that the method of the present invention improves fluid loss characteristics using nonionic polymers, and anionic polymers, e.g., guar gums, and nonionic polymers, e.g., CMC-not just anionic, e.g., polyacrylamide, polymers. Although the fluid loss results of the samples prepared with these chemical additives are not as favorably low as the samples made with the preferred "ALCOMER 228" polymer, they do show that the method of the present invention is not selective to anionic polymers only.

The fluid loss data shows that with 1000 ppm calcium chloride contaminated solution, the rehydrated samples performed unexpectedly better than their "dry" counterparts, as emphasized in FIG. 8. However, it should be noted that (with the exception of "MON PAC" CMC) although the rehydrated samples showed improved fluid loss values over the "dry" samples, there was still some degradation from the calcium contamination when compared to the deionized (DI) water fluid loss values. In the previous testing, it was evident that samples rehydrated with the preferred "ALCOMER 228" polymer, showed little to no difference between the calcium contaminated fluid loss values and the DI water fluid loss values. This indicates that although the method of the present invention can be used with other polymer groups and fluid loss reduction water-soluble polymers, the method provides the best results using the preferred "ALCOMER 228" polymer, with respect to calcium contamination.

The exceptions to this characteristic were CMC samples, as shown in Tables VII and VIII. Both the "dry" and rehydrated CMC samples showed little to no difference in fluid loss values when dispersed in 1000 ppm $CaCl_2$, versus DI water. Although these CMC samples may seem promising with respect to calcium contamination resistance (as did the "ALCOMER 228" polymer), it may not be advisable to use CMC, guar gums, or any other natural organic derivative that will degrade with time, in a product that must remain stable in place for long periods of time, because aging causes CMC and guars to ferment. However, fermentation of additives can be prevented by adding a biocide, e.g., together with the polymer, to inhibit bacterial growth.

TABLE VI

| SAMPLE NAME | DESCRIPTION |
|---|---|
| A10-10 @ 10 | Dry granular base clay #4 mixed with 10 lb./ton of "OFXC 1146" cationic polymer, and 10 lb./ton of SAPP. |
| C19-10 @ 10 | Dry granular base clay #5, 10 lb./ton of "MAGNIFLOC 903N" nonionic polymer, and 10 lb./ton of SAPP. |
| A3-10 @ 10 | Dry granular base clay #4, 10 lb./ton of "JAGUAR CDP," and 10 lb./ton of SAPP. |
| A20-10 @ 10 | Dry granular base clay #4 mixed with 10 lb./ton of "JAGUAR 8920" cationic guar, and 10 lb./ton of "SAPP". |
| A21-10 @ 10 | Dry granular base clay #4 mixed with 10 lb./ton of "JET JEL" nonionic guar, and 10 lb./ton of SAPP. |
| A22-25 @ 10 | Dry granular base clay #4 mixed with 25 lb./ton of "SIGMA" CMC, and 10 lb./ton of SAPP. |
| A8-25 @ 10 | Dry granular base clay #4, 25 lb./ton of "MON PAC" CMC, and 10 lb./ton of SAPP. |
| U-10F | Powdered base clay #4 rehydrated with 10 lb./ton of "OFXC 1146" and 10 lb./ton of "SAPP" using Single Rehydration Method. |
| W-19F | Powdered base clay #5 rehydrated with 10 lb./ton of "MAGNIFLOC 903N" nonionic polymer, and 10 lb./ton of SAPP using Single Rehydration Method. |
| U-3F | Powdered base clay #4 rehydrated with 10 lb./ton of "JAGUAR CDP" and 10 lb./ton of SAPP using the Single Rehydration Method. |
| U-20F | Powdered base clay #4 rehydrated with 10 lb./ton of "JAGUAR 8920" cationic guar gum and 10 lb./ton of SAPP using Single Rehydration Method. |
| U-21F | Powdered base clay #4 rehydrated with 10 lb./ton of "JET JEL" and 10 lb./ton of SAPP using Single Rehydration Method. |
| U-22F | Powdered base clay #4 rehydrated with 25 lb./ton of "SIGMA" CMC and 10 lb./ton of SAPP using Single Rehydration Method. |
| U-8F | Powdered base clay #4 rehydrated with 25 lb./ton of "MON PAC" CMC and 10 lb./ton of SAPP using the Single Rehydration Method. |
| U-23L | Dry granular base clay #4 rehydrated with 53.7 lb./ton of "PLURADYNE CA 135" and the amount of water equal to the weight of the clay used. |
| U-23M | Dry granular base clay #4 rehydrated with 90.9 lb./ton of "PURADYNE CA 135" and the amount of water equal to the weight of the clay used. |

TABLE VII

| SAMPLE | FLUID LOSS API (mls) Deionized Water | FLUID LOSS API (mls) 1000 PPM CaCl$_2$ |
|---|---|---|
| A10-10 @ 10 | 12.7 | 16.2 |
| C19-10 @ 10 | 11.6 | 17.1 |
| A3-10 @ 10 | 12.5 | 17.1 |
| A20-10 @ 10 | 14.1 | 18.2 |
| A21-10 @ 10 | 13.5 | 16.5 |
| A22-25 @ 10 | 9.7 | 13.3 |
| A8-25 @ 10 | 10.5 | 10.3 |
| U-10F | 11.0 | 12.2 |
| W-19F | 9.8 | 13.0 |
| U-3F | 11.0 | 13.5 |
| U-20F | 11.9 | 13.5 |
| U-21F | 12.2 | 12.7 |
| U-22F | 8.5 | 9.4 |
| U-8F | 9.5 | 9.2 |
| U-23L | 14.9 | 19.7 |
| U-23M | 18.2 | 21.6 |

TABLE VIII

Comparative DELTA Values between DI Water API Fluid Losses and 1000 ppm CaCl$_2$ API Fluid Losses

| Base Clay/Polymer/ "SAPP" Combination | DELTA (mls) "Dry-Mixed" | DELTA (mls) Rehydrated |
|---|---|---|
| Base clay #4, 10 lb./ton "OFXC 1146" cationic polymer, 10 lb./ton SAPP | 3.5 | 1.2 |
| Base clay #5, 10 lb./ton "MAGNIFLOC 903" nonionic polymer, 10 lb./ton SAPP | 5.5 | 3.2 |
| Base clay #4, 10 lb./ton "JAGUAR CDP" anionic guar, 10 lb./ton SAPP | 4.6 | 2.5 |
| Base clay #4, 10 lb./ton "JAGUAR 8920" cationic guar, 10 lb./ton SAPP | 4.1 | 1.6 |
| Base clay #4, 10 lb./ton "JET JEL" nonionic guar, 10 lb./ton SAPP | 3.0 | 0.5 |
| Base clay #4, 25 lb./ton "SIGMA" CMC, 10 lb./ton SAPP | 3.6 | 0.9 |
| Base clay #4, 25 lb./ton "MON PAC" CMC, 10 lb./ton SAPP | −0.2 | −0.3 |
| Base clay #4, 53.7 lb./ton of "PLURADYNE CA 135" Polyethylene imine | — | 4.8 |
| Base clay #4, 90.9 lb./ton of "PLURADYNE CA 135" Polyethylene imine | — | 3.4 |

Other suitable water-soluble polymers include polyvinylpyrrolidone (PVP), having a monomeric structure as follows:

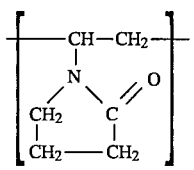

The water-solubility of PVP depends upon the degree of hydrolysis of the polyvinylpyrrolidone, and whether the PVP is in the form of a metal salt of PVP, such as sodium or potassium. For example, some or all of the PVP monomeric units can be hydrolyzed to the structure:

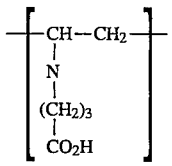

and the PVP can be used in the salt form, e.g., sodium or potassium polyvinylpyrrolidone. The molecular weight of the PVP polymer (or any other water-soluble polymer disclosed herein) is not critical so long as the polymer is water-soluble. The polymer should be sufficiently water-soluble to provide at least 1 gram of dissolved polymer in 100 milliliters of water to sufficiently impregnate the smectite clay. Any undissolved polymer will not deleteriously affect the clay impregnation step. Excellent results can be obtained with PVP having weight average molecular weights in the range of about 225 to about 1,000,000 or more, preferably about 2,000 to about 100,000.

Other PVP derivatives that are water-soluble include the following: N-Methylpyrrolidone (NMP); N-Ethylpyrrolidone (NEP); and N-Vinylpyrrolidone, having the structures:

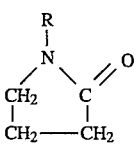

NMP: R = $CH_3$
NEP: R = $CH_3CH_2$
NVP: R = $CH_2$:CH

Other substituted water-soluble pyrrolidones useful in accordance with the present invention include: N-isopropyl-5-methylpyrrolidone; pyrrolidone-N-acetic acid; N-cyclohexyl-pyrrolidone; and hexamethylene-bis(2-pyrrolidone).

Other water-soluble polymers useful for impregnating the smectite clay in accordance with the present invention include poly(ethylene oxide) having monomer units: $-[O-(CH_2)-(CH_2)]-$, hereinafter PEO; available as "PLURACOL E" from Wyandote, and "POLYOX WSR" or "CARBOWAX" from Union Carbide-water-soluble even at the very high molecular weights, e.g., 1,000,000 or more; poly(propylene oxide), having monomer units:

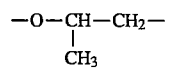

water-soluble only in the oligomer form, having weight average molecular weights from about 100 to about 1,000, preferably about 100 to about 500; propyl(vinyl methyl ether), having monomer units:

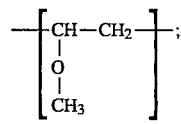

and their hydrolysis product derivatives. Poly(vinyl methyl ether) is water-soluble and available commercially as "GANTREZ M" from GAF Corporation and is water-soluble, like PEO, at room temperature, at very high molecular weights, e.g., from about 120 to about 1,000,000 and more. Another suitable water-soluble polymer is polyoxymethylene (POM), having monomer units $-[O-CH_2]-$, which are water-soluble in the very short oligomer form, i.e., poly(formaldehyde) and having a melting point of about 180° C., and weight average molecular weights from about 40 to about 400. Oxide copolymers also are suitable, including random and block copolymers of poly(ethylene oxide) with a variety of monomers, including propylene oxide and/or poly(propylene oxide). One particularly useful copolymer is sold as "PLURONIC F68" having a poly(propylene oxide) core molecular weight of about 1,800 and including 80% w/w ethylene oxide units, giving a combined molecular weight for the two outer poly(ethylene oxide) sections of 6,600—for a combined weight average molecular weight of 8,400.

The polyacrylic acid polymers are also suitable, having monomer units:

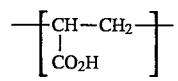

and are commercially available as "CARBOPOL" resins from B. F. Goodrich and "PRIMAL" resins from Rohn & Haas. The water-soluble polyacrylic acid and polyacrylate polymer can be non-cross-linked or slightly cross-linked.

Other, water-soluble derivatives of, and substituted, polyacrylic acid also are useful in accordance with the present invention, such as poly(methacrylic acid), (PMAA), having a monomeric structure:

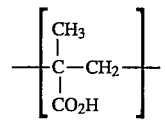

Similar water-soluble polymers that are suitable in accordance with the present invention include poly(methacrylamide), of PMAAm, having the general monomeric structure:

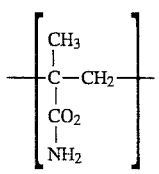

Poly(N,N-Dimethylacrylamide), having the general monomeric structure:

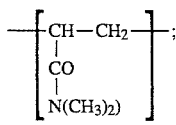

Poly(N-Isopropylacrylamide), or PIPAAm, having the monomeric structure:

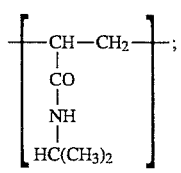

Poly(N-acetamidoacrylamide), having a monomeric structure:

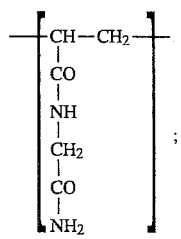

and Poly(N-acetamidomethacrylamide), having a monomeric structure:

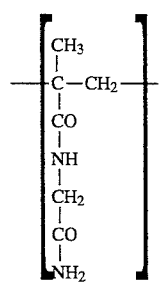

Water-soluble copolymers including any one or more of the above-described acrylic polymers also are useful in accordance with the principles of the present invention, including the acrylic interpolymers of polyacrylic acid and poly(methacrylic acid); polyacrylic acid with poly(methacrylamide) and/or poly(acrylamide); and polyacrylic acid with methacrylic acid.

Suitable water-soluble vinyl polymers include poly(vinyl alcohol):

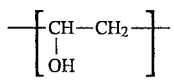

poly(vinyl acetate):

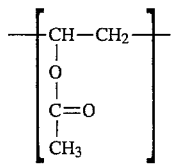

and their copolymers, e.g., poly(vinylacetate-co-vinyl alcohol):

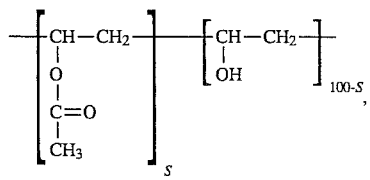

also known as partially hydrolyzed poly(vinylacetate) or partially acetylated poly(vinyl alcohol), available commercially from DuPont as "ELVANOL" and from Airco Chemical as "VINOL".

Other suitable water-soluble polymers include polyvinyloxazolidone (PVO) and polyvinylmethyloxazolidone (PVMO), having the monomeric structures:

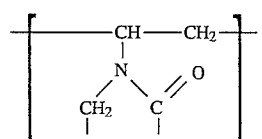

PVO: R = H
PVMO: R = CH$_3$

Blue bentonites and calcium bentonites also were tested after treatment in accordance with the present invention. Tables X and XI show the results of the polymer rehydration process on blue and calcium bentonites-the particular clay and polymer impregnated being shown in Table IX. The results show that the polymer rehydration process improves the contaminant resistance of both blue bentonite and calcium bentonites, as well as the sodium bentonite tested supra.

TABLE IX

| SAMPLE | DESCRIPTION |
| --- | --- |
| I16-25 @ 10 | Dry granular blue base clay #7 mixed with 25 lb./ton of "ALCOMER 228" and 10 lb./ton of SAPP. |
| R-16F | Dry granular blue base clay #7 and 25 lb./ton of "ALCOMER 228" and 10 lb./ton of SAPP rehydrated up to 35% moisture using Single Rehydration method. |
| K16-25 @ 10 | Dry granular blue base clay #6 mixed with 25 lb./ton of "ALCOMER 228" and 10 lb./ton of SAPP. |
| MB-1 | Dry granular blue base clay #6 and 25 lb./ton of "ALCOMER 228" and 10 lb./ton of SAPP rehydrated up to 35% moisture using Single Rehydration Method. |
| L16 @ 25 | Dry calcium base clay #8 mixed with 25 lb./ton of "ALCOMER 228" polymer. |
| Y-16Q | Calcium base clay #8 and 25 lb./ton of "ALCOMER 228" rehydrated up to 50% moisture using Single Rehydration Method. |

TABLE X

| SAMPLE | API FLUID LOSS (mls) (DI Water) | API FLUID LOSS (mls) 1000 ppm $CaCl_2$ |
| --- | --- | --- |
| I16-25 @ 10 | 13.2 | 15.4 |
| R-16F | 11.6 | 12.7 |
| K16-25 @ 10 | 11.3 | 11.9 |
| MB-1 | 10.5 | 10.0 |
| L16 @ 25 | 34.4 | 96.2 |
| Y-16Q | 25.4 | 56.7 |

TABLX XI

Comparative DELTA Values between DI Water API Fluid Losses and 1000 ppm $CaCl_2$ Fluid Losses

| Base Clay/Polymer/ SAPP Combination | DELTA (mls) "Dry-Mixed" | DELTA (mls) Rehydrated |
| --- | --- | --- |
| Blue base clay #7, 25 lb./ton of "ALCOMER 228" polymer, and 10 lb./ton of SAPP | 2.2 | 1.1 |
| Blue base clay #6, 25 lb./ton of "ALCOMER 228" polymer, and 10 lb./ton of SAPP | 0.7 | −0.5 |
| Calcium bsae clay #8 and 25 lb./ton of "ALCOMER 228" polymer | 61.8 | 31.3 |

For the grout composition testing, the grout mixtures were prepared (using a Kitchen Aid Mixer with a beater attachment) by dispersing the components separately into the agitating water, and then mixing (on the slowest speed) for two minutes after the addition of the last component. The sides of the bowl and the beater were not scraped down during mixing. Although the grout mixtures still contained lumps, this method of grout preparation was closest at simulating actual field grout production.

Mixing methods for combining the components of grout compositions are well known in the art. There are four fundamental methods of mixing grout materials. These are (1) hand mixing, (2) paddle mixing, (3) recirculation mixing, and (4) jet mixing. They range from labor intensive mixing of grouts with hand-held implements to equipment intensive mechanical methods. Each method has advantages and/or disadvantages which must be considered to meet a contractor's specific grouting requirements.

Hand Mixing:
Hand mixing involves agitation of the grout slurry with shovels, rakes, canoe paddles, or other hand-held implements. In general, it is a labor intensive and time consuming method applicable to situations where the slurry volume is small. Hand mixing should be avoided when the neat cement volume requirement exceeds five sacks. Hand mixing is not an effective means of grout mixing on a routine basis. It requires more labor, takes 3 to 5 times longer, and the grout slurry quality is generally much poorer than that achieved by mechanical mixing methods.

Paddle Mixing:
Paddle mixing consists of the mechanical agitation of the grout slurry by paddles or blades rotating in a barrel-like container. In most instances, grout preparation is accomplished by mixing numerous small batches to a manufacturer's specifications. The smaller batches are transferred to a much larger holding tank and pumped from there once the desired volume of grout has been prepared. Large volume paddle mixers may not require transfer of the grout into a separate holding tank. Paddle mixers are found on several commercially manufactured grouting units.

A common example of paddle mixing is the use of a portable mortar mixer. Mortar mixers are generally sized to easily accommodate 3.5 cu. ft. of cement slurry. Accordingly, 15 to 18 gallons of water are added to the mixer drum. Three 94-lb bags of dry grout composition are then added to water to form a water slurry, while the slurry is continually mixed. Once the grout slurry has achieved a consistency smooth enough to pump, the grout is poured into a holding tank such as a livestock water tank. Numerous mixes are made until a sufficient batch has been prepared for pumping. The use of a mortar mixer is particularly applicable to neat grout slurries where the total grout volume requirement does not exceed 20 bags of dry composition. Larger slurry volumes of 20 to 60 bags can be handled by this mixing method, but with less efficiency than the jet-type mixing method.

Recirculation Mixing:
Recirculation mixing involves pouring the dry grout materials into a high velocity fluid stream. The equipment required includes a large volume mixing tank, a moderate to high volume output pump, and separate suction and discharge hoses. Mixing is accomplished through turbulence created in the mixing tank by the high velocity fluid stream from the pump discharge. Discharge and suction hoses are placed at opposite ends of the mixing tank to prevent dead spots in the mixing tank where the grout material will tend to settle out. Recirculation mixing is a batch-type mixing method designed for heavy slurries. It tends to be more labor intensive than the paddle mixing method since additional slurry agitation with hand-held implements is frequently required.

Jet Mixing:
Jet mixing equipment consists of a small diameter water nozzle discharge and a funnel-shaped hopper. The mixer creates a venturi effect by passing a high velocity water stream through the nozzle which is set below the grout material hopper. This venturi effect causes a localized drop in pressure below the hopper which draws the dry grout material into the high velocity fluid stream. As the grout material enters the fluid stream, the turbulence mixes the material into a uniform slurry.

Jet mixing is controlled by the volume of water exiting the nozzle, the size of the water jet, and the diameter of the hopper orifice through which the grout material enters the fluid stream. Jet mixers should be designed so that a pressure of at least 100 psi occurs at the inlet hose upstream from the nozzle. When designed correctly, the desired slurry characteristics can be obtained at the mixing point with one pass of the fluid. However, limitations to the hopper size and pump capabilities generally require jet mixing to be a combination jet mixing/recirculation method.

Although any of the above-outlined mixing methods are useful, the preferred method of mixing the grout composition of the present invention is as follows:

(1) Dry blend sodium bentonite, calcium bentonite (or a filler), water-soluble polymer, and a dispersing agent, e.g., SAPP together. If the fines from the Contaminant Resistant Clay (CRC), described in the parent application are to be substituted for the sodium bentonite, then the water-soluble polymer can be eliminated, since it was impregnated into the clay at an earlier stage.

(2) Feed the powdered mixture into a pug mill.

(3) Water is then sprayed onto the material as it passes through the pug mill at a rate to raise the moisture up to about 15% to about 45% (by weight).

(4) The hydrated mixture is then passed through an extruder and comes out as noodles.

(5) The extruded noodles are then dried down to less than about 12%, preferably less than about 10% moisture (by weight).

(6) The dried noodles are then reduced to produce both granular (if desired) and fines (usually less than 50 mesh).

It should be noted that the product made after step (1) (whether sodium bentonite or polymer-impregnated sodium bentonite fines are used) can be used in the final grout mixtures. Extrusion is an option.

| SAMPLE | GROUT F | GROUT G |
|---|---|---|
| pH | 5.4 | 5.5 |
| Cone Penetrometer (mm) 15 minutes | >100 | >100 |
| Cone Penetrometer (mm) 2 hours | 70.5 | 56 |
| Cone Penetrometer (mm) 24 hours | 39 | 37 |
| MUD BALANCE | 71 lbs/cu ft 9.5 lbs/gal 492 psi/1000 ft 1140 Kg/M³ | 71 lbs/cu ft 9.5 lbs/gal 492 psi/1000 ft 1140 Kg/m³ |
| FREE SWELL (mls/2 g) DI Water | 12 | 14 |
| FREE SWELL (mls/2 g) 1000 ppm CaCl$_2$ | 17 | 18 |
| FREE SWELL (mls/2 g) 1% Sea Water Salt | 19 | 18.5 |

In order to gauge how long the grouts would retain their "pumpable" or "pourable" states while under agitation, the grouts were mixed for longer periods of time and checked for "pourability" conditions at intervals. A grout is "pourable" when it can be poured out of a mixing bowl without the use of a spatula. Also, after being poured out, the pourable grout should settle in the new container and form a solidifying grout mass with a level surface (without any peaks) and minimal voids or air bubbles.

| POURABILITY OF GROUTS While Mixing | | |
|---|---|---|
| TOTAL MIXING TIME | GROUT F | GROUT G |
| 5 Minutes | Pourable | Pourable |
| 7 Minutes | Pourable | Pourable |
| 9 Minutes | Pourable | Pourable, but thicker* |
| 10 Minutes | Pourable | Pourable, but thicker* |

*Although Grout G still had "pourable" characteristics after 9 and 10 minutes of mixing time, it was starting to get thicker.

It should be noted that although a grout mixture may not be readily pourable, it may still be pumpable. Many view the Cone Penetrometer test as indicating when a mixture has thickened and become unpumpable. In this test, a weighted cone is released into the mixture and the depth which it sinks or penetrates is recorded. Higher depth readings indicate that the mixture was fluid enough to allow the cone to sink deeply. Lower depth readings show that the mixture was rigid enough to prevent the cone from penetrating deeply. Some view a depth reading of 75 mm or greater to be pumpable and anything lower to be less pumpable. Although the table of the "Pourability of Grouts" indicate that Grout G was starting to get thicker after 9–10 minutes, the cone penetrometer tests indicate that it was still pumpable after 15 minutes. It should also be noted that pumpability is greatly dependent on the type of pumping equipment used and the percent solids of the compositions.

To test the contaminant resistance of the grouts against severe permeants, the Top Loading Filter Press test was used. The first cell contained Grout F (25% solids) with the job site water as the permeant. The second cell had Grout D (25% solids) with 3.8% sea water salt solution (simulated sea water) as the permeant. Grout G is a "middle" blend between Grout F and Grout D. The third cell contained a 20% solids grout composed of straight polymer-impregnated sodium bentonite fines with a few drops of dispersant as a thinner. This third sample had 3.8% sea water salt solution as its permeant. Due to the limited quantity of the job site water, only one of the cells could contain this sample as the permeant. With respect to conductivity and salinity, the 3.8% sea water salt solution is more severe than the submitted job site water sample.

| AVERAGE DAILY FLOW RATES FROM TOP LOADING FILTER PRESS TEST (Grams/Hour) | | | |
|---|---|---|---|
| Day | GROUT F | GROUT D | 20% Solids polymer-impregnated sodium bentonite fines/dispersing agent |
| 1 | 0.64 | 0.65 | 1.34 |
| 2 | 0.30 | 0.28 | 0.90 |
| 3 | 0.23 | 0.31 | 0.97 |
| 4 | 0.18 | 0.30 | 0.78 |
| 5 | 0.13 | 0.22 | 0.92 |
| 6 | 0.14 | 0.16 | Terminated*** |
| 7 | 0.13 | 0.23 | |
| 8 | 0.12 | 0.21 | |
| 9 | 0.12 | 0.20 | |
| 12 | 0.09* | 0.17* | |
| 13 | 0.22** | 0.36** | |

AVERAGE DAILY FLOW RATES FROM TOP LOADING FILTER PRESS TEST (Grams/Hour) -continued

| Day | GROUT F | GROUT D | 20% Solids polymer-impregnated sodium bentonite fines/dispersing agent |
|---|---|---|---|
| 14 | 0.23 | 0.41 | |
| 15 | 0.28 | 0.43 | |
| 16 | 0.26 | 0.36 | |
| 29 | 0.24 | 0.35 | |
| 30 | 0.26 | 0.35 | |
| 31 | 0.25 | 0.29 | |
| 34 | 0.37**** | 0.73**** | |
| 35 | 0.28 | 0.48 | |
| 36 | 0.25 | 0.45 | |
| 37 | 0.30 | 0.51 | |
| 38 | 0.28 | 0.52 | |

*These values were averages from three days (weekend).
**From this day on the pressure was completely released from the cells for overnight and then reapplied during the day.
***Because there was a leak at the base of cell, this sample had to be terminated.
****The pressure was completely released from the cells for the weekend and then reapplied during the day. Prior, the pressure was never released for more than one day.

After 13 days, the job site water still has not penetrated Grout F. The pressure was then released from the cells, overnight, and reapplied during the day. In releasing the pressure from the cells, the grout samples would tend to swell or bloat up and possibly allow more permeant to infiltrate the layer. The pressure changes simulate possible occurrences in real field applications where there could be variable pressure conditions. Also, the releasing of the pressure may disturb the grout layers and cause irregularities or ruptures.

On the 32nd and 33rd day of testing, the pressure was completely released from the cells (over a weekend). Therefore the cells were allowed to "bloat" up for 72 hours instead of the usual 16 hours. It can be seen by the subsequent higher flow rates that the samples were allowed to sit unconfined for too long and resulted in an "over-bloated" state. These flow rates tended to decrease during the next five days when the pressure was applied to the cells on a normal basis.

Special attention should then be exercised to see if the samples could either recover from such ruptures and re-establish its sealant qualities as well as and maintain its contaminant resistance. Although the sea water permeants penetrated Grout D and the 20% polymer-impregnated sodium bentonite fines grout composition, within the first two days of testing, there was not a significant increase in the filtrate values or flow rates. In fact, on the third day of the test, Grout D experienced a noticeable increase in filtrate values for about 1 hour, and then subsequently the values decreased and stabilized. It appears that the grout sample had an irregularity or rupture in the cake layer, but was able to "heal" itself and recover. Although testing is not completed, the results so far indicate that the three grout samples were able to resist degradation from the saline permeants and able to either maintain adequate sealant characteristics with the presence of numerous voids and/or recover from occurring disturbances in the sample layer cake.

The grouts were tested in Rigid Wall Permeameters with both tap water and simulated sea water (3.8% sea water salt solution) as the permeants. Although the rigid wall permeability testing has been going for 3–4 weeks, below are some preliminary results. The grouts were prepared as described on page 64. Tap water was used in the grout mixture and 5 feet of head was applied to the rigid wall cells.

RIGID WALL PERMEABILITY with Tap Water and 3.8% Seal Water Salt as the Permeants

| Day | Grout F Tap Water | Grout G Tap Water | Grout G Sea Water | Grout G Sea Water |
|---|---|---|---|---|
| 1 | $1.06 \times 10^{-7}$ | $9.08 \times 10^{-8}$ | — | — |
| 2 | $4.52 \times 10^{-8}$ | $3.88 \times 10^{-8}$ | — | — |
| 3 | $3.01 \times 10^{-8}$ | $1.94 \times 10^{-8}$ | — | — |
| 6 | $1.51 \times 10^{-8}$ | $2.16 \times 10^{-8}$ | — | — |
| 7 | $3.77 \times 10^{-8}$ | $1.29 \times 10^{-8}$ | — | — |
| 8 | $2.26 \times 10^{-8}$ | $1.29 \times 10^{-8}$ | $7.39 \times 10^{-8}$ | $1.04 \times 10^{-7}$ |
| 9 | $3.01 \times 10^{-8}$ | $6.45 \times 10^{-8}$ | $3.69 \times 10^{-8}$ | $4.43 \times 10^{-8}$ |
| 10 | $1.51 \times 10^{-8}$ | $3.88 \times 10^{-8}$ | $3.69 \times 10^{-8}$ | $2.95 \times 10^{-8}$ |
| 13 | $2.01 \times 10^{-8}$ | $1.94 \times 10^{-8}$ | $2.22 \times 10^{-8}$ | $2.46 \times 10^{-8}$ |
| 14 | $3.01 \times 10^{-8}$ | $1.29 \times 10^{-8}$ | $1.47 \times 10^{-8}$ | $2.95 \times 10^{-8}$ |
| 15 | $2.26 \times 10^{08}$ | $2.58 \times 10^{-8}$ | $2.95 \times 10^{-8}$ | $2.21 \times 10^{-8}$ |
| 20 | $1.66 \times 10^{-8}$ | $1.42 \times 10^{-8}$ | $1.77 \times 10^{-8}$ | $1.92 \times 10^{-8}$ |
| 21 | $2.26 \times 10^{-8}$ | $2.58 \times 10^{-8}$ | $2.21 \times 10^{-8}$ | $3.69 \times 10^{-8}$ |
| 22 | $1.51 \times 10^{-8}$ | $1.94 \times 10^{-8}$ | $2.21 \times 10^{-8}$ | $1.47 \times 10^{-8}$ |
| 23 | $1.51 \times 10^{-8}$ | $3.23 \times 10^{-8}$ | $2.21 \times 10^{-8}$ | $2.21 \times 10^{-8}$ |
| 24 | $7.52 \times 10^{-8}$ | $1.29 \times 10^{-8}$ | $1.47 \times 10^{-8}$ | $2.21 \times 10^{-8}$ |
| 27 | $1.51 \times 10^{-8}$ | $1.94 \times 10^{-8}$ | $1.97 \times 10^{-8}$ | $2.22 \times 10^{-8}$ |
| 28 | $1.51 \times 10^{-8}$ | $3.23 \times 10^{-8}$ | $2.21 \times 10^{-8}$ | $2.21 \times 10^{-8}$ |
| 29 | $1.51 \times 10^{-8}$ | $2.58 \times 10^{-8}$ | $2.21 \times 10^{-8}$ | $2.95 \times 10^{-8}$ |
| 30 | $2.26 \times 10^{-8}$ | $3.23 \times 10^{-8}$ | $2.21 \times 10^{-8}$ | $2.21 \times 10^{-8}$ |
| 31 | $1.51 \times 10^{-8}$ | $1.94 \times 10^{-8}$ | $1.47 \times 10^{-8}$ | $1.47 \times 10^{-8}$ |
| 34 | $1.76 \times 10^{-8}$ | $1.51 \times 10^{-8}$ | $1.97 \times 10^{-8}$ | $1.97 \times 10^{-8}$ |

Preliminary results with sea water as the permeant indicate that both grouts produce permeabilities similar to the grout columns with tap water as their permeants. This indicates that these grout formulas are currently able to withstand degradation from the sea water. This is a vast improvement over some prior art bentonite grout products which have failed in the rigid wall columns in a shorter time span and with less severe permeants. The data collected suggest that the polymer-impregnated sodium bentonite fines-containing grout formulations appear to be highly contaminant resistant to severely saline permeants.

The following outlines two formulations for Grout G. The first is the Separate Component Grout G Formula which has the components blended separately in the grout preparation. Although this method will undoubtedly be less expensive, it will require more attention and added steps. The second formulation is the Combined Grout G Formula where all of the components are combined into one powder product prior to being shipped to the job site or prior to being added to the water.

The following is a formulation for preparing Grout G by a separate component addition method.

(1) Fill mixing tank with fresh water.
(2) Add the powdered SAPP (sodium acid pyrophosphate) and agitate water until dissolved.
(3) Add the calcium bentonite clay and agitate until evenly dispersed.
(4) Add the sodium bentonite fines and agitate for 2–5 minutes. Please note that the mixing time will vary depending on the type of mixing equipment used.

GROUT G COMPONENTS:

| PREFERRED COMPONENT | PREFERRED DOSAGE |
|---|---|
| Powdered Sodium Acid Pyrophosphate (SAPP) | 0.05–0.06 lbs/gal* |
| Calcium Bentonite Clay | 0.97 lbs/gal |

-continued

GROUT G COMPONENTS:

| PREFERRED COMPONENT | PREFERRED DOSAGE |
|---|---|
| Polymer-Impregnated, Extruded Sodium Bentonite Fines (−50 mesh), e.g., >300 μm | 1.81 lbs/gal |

*Laboratory testing shows that the amount of SAPP preferably should be no less than 0.05 lbs/gal.

Group F is the same composition, prepared in the same manner as Grout G, but having slightly more SAPP dispersant, e.g., 0.06 lbs/gal. vs. 0.05 lbs/gal.

Upon addition of the sodium bentonite fines material, it was found in the lab that the grout can be mixed for 8–10 minutes before it starts to thicken and become less pumpable or pourable.

The following is the formulation for preparing a combined dry mixed powdered product which can be mixed directly into the water in one step.

COMBINED GROUT G COMPONENTS:

| COMPONENT | PERCENTAGE |
|---|---|
| Powdered Sodium Acid Pyrophosphate (SAPP) | 1.8–1.9%* |
| Calcium Bentonite Clay | 34.4% |
| Polymer-Impregnated, extruded Sodium Bentonite Fines (−50 mesh) | 63.8% |

*Laboratory testing shows that in order for the grout to be pumpable for 8–10 minutes, the preferred amount of SAPP used should be no less than about 1.8%, based on the weight of water-insoluble components.

Grout F is the same composition, prepared in the same manner as Grout G, but having slightly more SAPP dispersant, e.g., 1.9% by weight of water-insoluble solids vs. 1.8%.

The dry-blended Grout G (Combined Formula) can be added directly to the agitating fresh water.

It should be understood that the present disclosure has been made only by way of preferred embodiments and that numerous changes in details of construction, combination and arrangement of parts can be resorted to without departing from the spirit and scope of the invention as hereunder claimed.

What is claimed is:

1. A method of protecting a structure against penetration by contaminated water comprising mixing a thixotropic slurry composition comprising:
   about 15% to about 85% water;
   about 7% to about 60% water-swellable sodium bentonite clay, said sodium bentonite clay comprising about 25% to about 100% by weight of the slurry, based on the dry weight of water-insoluble solids in the slurry;
   about 4% to about 35% solid, essentially non water-swellable particulate filler; and
   about 0.001% to about 8% of a water-soluble polymer;
and pumping the composition, while in slurry form, to dispose the composition in contact with the structure so that the composition sets in contact with the structure, while maintaining flexibility of the composition after complete curing of the composition.

2. The method of claim 1, wherein the structure comprises a conduit disposed within a drill hole and wherein the composition in slurry form is pumped into an annular space defined between the conduit and an earthen formation formed by the drill hole, to cement the conduit into position within the drill hole.

3. The method of claim 1, wherein the structures comprises a conduit disposed within an abandoned drill hole, and the conduit is cemented in position with said composition to prevent the conduit from collapsing.

4. The method of claim 1, wherein the structure comprises an excavated trench wall.

5. The method of claim 1, wherein the sodium bentonite clay has a dry particle size less than about 300 μm.

6. The method of claim 5, wherein the sodium bentonite clay has a dry particle size less than about 200 μm.

7. The method of claim 6, wherein the sodium bentonite clay has a dry particle size less than about 75 μm.

8. A method of protecting a structure against penetration by contaminated water comprising mixing a slurry comprising:
   about 15% to about 85% water;
   about 7% to about 60% water-swellable sodium bentonite clay;
   about 4% to about 35% solid, essentially non water-swellable particulate filler; and
   about 0.001% to about 8% of a water-soluble polymer;
pumping the composition, while in slurry form, to dispose the composition in contact with the structure so that the composition sets in contact with the structure, while maintaining flexibility of the composition after complete curing of the composition; and
   wherein the sodium bentonite is rewetted to a moisture content of about 15% to about 45%, based on the dry weight of the sodium bentonite clay, and impregnated with dissolved polymer, extruded, dried to a moisture content less than about 12% by weight and then ground to a particle size less than about 75 μm.

9. A method of protecting a structure against penetration by contaminated water comprising mixing a slurry comprising:
   about 15% to about 85% water;
   about 7% to about 60% water-swellable sodium bentonite clay;
   about 4% to about 35% solid, essentially non water-swellable particulate filler; and
   about 0.001% to about 8% of a water-soluble polymer;
pumping the composition, while in slurry form, to dispose the composition in contact with the structure so that the composition sets in contact with the structure, while maintaining flexibility of the composition after complete curing of the composition; and
   wherein the sodium bentonite is rewetted to a moisture content of about 15% to about 45%, based on the dry weight of the sodium bentonite clay, and impregnated with dissolved polymer, extruded, dried to a moisture content less than about 12% by weight and then ground to a particle size less than about 300 μm.

10. The method of claim 8, wherein the sodium bentonite clay is impregnated with 0.01% to about 10% by weight of said water-soluble polymer, based on the dry weight of sodium bentonite clay.

11. The method of claim 8, wherein the sodium bentonite clay is impregnated with at least about 1% by weight of said water-soluble polymer, based on the dry weight of sodium bentonite clay.

12. The method of claim 11, wherein the sodium bentonite clay is impregnated with dissolved polymer in an amount of about 1% to about 2% by weight, based on the dry weight of the sodium bentonite clay.

13. In a method of protecting a structure against penetration by contaminated water comprising mixing a thixotropic slurry composition and pumping the composition, while in slurry form, to dispose the composition in contact with the structure so that the composition sets in contact with the structure, while maintaining flexibility of the composition after complete curing of the composition, the improvement comprising:

homogeneously mixing a composition comprising a water-swellable sodium bentonite clay, dried to moisture content of 12% by weight or less, in an amount of about 25% to about 100% by weight of water-insoluble solids in the composition, together with a water-soluble polymer, in an amount of about 0.01% to about 10% by weight, based on the weight of bentonite clay solids in the composition;

rewetting the sodium bentonite clay with water to a moisture content of more than about 12% by weight, and impregnating the clay with water-dissolved polymer;

redrying the clay to a moisture content less than about 12% by weight, based on the dry weight of the clay; and mixing the redried clay and polymer with water to form said thixotropic slurry composition.

14. In the improved method of claim 13, further including impregnating the sodium bentonite clay with at least about 1% polymer, based on the dry weight of the sodium bentonite clay.

15. In the improved method of claim 13, further including impregnating the sodium bentonite clay with about 1% to about 2% polymer, based on the dry weight of the sodium bentonite clay.

16. In the improved method of claim 13, wherein the sodium bentonite clay is rewetted to a moisture content of at least about 15% by weight.

17. In the improved method of claim 16, wherein the sodium bentonite clay is rewetted to a moisture content of about 18% to about 100% by weight, based on the weight of the dry sodium bentonite clay.

18. In the improved method of claim 13, further including adding a dispersing agent together with the sodium bentonite clay and water-soluble polymer such that the rewetting step impregnates the clay with water and dispersing agent.

19. In the improved method of claim 18, wherein the dispersing agent for the sodium bentonite clay is included in the composition in an amount of about 0.05% to about 15%, based on the dry weight of water-insoluble solids in the composition.

20. In the improved method of claim 19, wherein the dispersing agent is selected from the group consisting of sodium acid pyrophosphate; tetra sodium acid pyrophosphate; sodium meta phosphate; sodium tetra phosphate; tannic acid; sodium tannate; soda ash; caustic soda; calcium lignosulfonate; lignin; chrome lignosulfonate; and mixtures thereof.

21. In the improved method of claim 13, further including adding calcium bentonite clay with said sodium bentonite clay and water-soluble polymer, in an amount of about 25% to about 45% by weight, based on the weight of water-insoluble solids in the composition.

22. In the improved method of claim 13 further including the steps of:

grinding the redried, polymer-impregnated sodium bentonite clay;

recovering finely ground particles, having a particle size less than 300 μm; and adding said finely ground sodium bentonite particles, in an amount of about 1% to about 100% by weight of polymer-impregnated sodium bentonite clay in the composition, with water to form said thixotropic slurry composition.

23. In the improved method of claim 13, wherein the thixotropic slurry composition includes about 15% to about 85% water.

24. In the improved method of claim 23, wherein the thixotropic slurry composition includes about 25% to about 85% water.

25. In the improved method of claim 23, wherein the thixotropic slurry composition includes about 15% to about 45% water.

26. In the improved method of claim 25, further including the step of extruding the composition through a die opening, after rewetting and prior to redrying, to impregnate the sodium bentonite clay with water-dissolved polymer.

27. In the method of claim 26, further including adding calcium bentonite clay to said sodium bentonite clay and water-soluble polymer, such that the rewetted composition includes about 25% to about 45% calcium bentonite clay, based on the weight of water-insoluble solids in the composition, prior to extruding.

* * * * *

UNITED STATES PATENT AND TRADEMARK OFFICE
CERTIFICATE OF CORRECTION

PATENT NO. : 5,476,142

DATED : December 19, 1995

INVENTOR : LAURA KAJITA

It is certified that error appears in the above-identified patent and that said Letters Patent is hereby corrected as shown below:

Column 8, line 52, "dry Weight" should be -- dry weight --.

Column 10, line 12, "TEAT METHOD" should be -- TREAT METHOD --.

Column 10, line 33, "days. (9) Dry" should be -- days. ¶(9) Dry --.

Column 10, line 51, "preformed" should be -- performed --.

Column 12, line 33, "614 7 hours," should be -- 6-7 hours, --.

Column 14, line 49, line beginning with P16-EL, "powder bsae" should be -- powder base --.

Column 14, line 72, line beginning with U-22F, "owdered" should be -- powdered --.

Column 18, line 17, "TOP-LOADING FTLTER" should be -- TOP-LOADING FILTER --.

Column 18, line 51, line beginning with 5, "7.91" should be -- 7.81 --.

Column 19, line 2, "TOP-LOADING FTLTER" should be -- TOP-LOADING FILTER --.

Column 19, line 16, line beginning with 1, "0.96" should be -- 0.86 --.

UNITED STATES PATENT AND TRADEMARK OFFICE
CERTIFICATE OF CORRECTION

PATENT NO. : 5,476,142

DATED : December 19, 1995

INVENTOR : LAURA KAJITA

It is certified that error appears in the above-identified patent and that said Letters Patent is hereby corrected as shown below:

Column 19, line 32, line beginning with 29, "i.05" should be -- 1.05 --.

Column 19, line 56, line beginning with 2, "2, -, -, -, 0.27, 1.07" should be -- 2, -, -, -, -, 0.27, 1.07 --.

Column 22, line 2, "TOP-LOADING FTLTER" should be -- TOP-LOADING FILTER --.

Column 22, line 7, "5" should be -- 6 --.

Column 22, line 31, line beginning with 55, "55, -, -, -, 0.18, 19.93" should be -- 55, -, -, -, -, 0.18, 19.93 --.

Column 24, lines 4-6, "invention. ¶The" should be -- invention. The --.

Column 25, line 33, line beginning with U-23M, " 'PURADYNE" should be -- "PLURADYNE --.

Column 31, line 35, "TABLX" should be -- TABLE --.

Column 31, line 47, "bsae" should be -- base --.

Column 37, line 9, "> 300 µm" should be -- < 300 µm --.

UNITED STATES PATENT AND TRADEMARK OFFICE
CERTIFICATE OF CORRECTION

PATENT NO. : 5,476,142
DATED : December 19, 1995
INVENTOR(S) : Laura Kajita

It is certified that error appears in the above-indentified patent and that said Letters Patent is hereby corrected as shown below:

Column 37, line 12, "Group" should be -- Grout --.

Signed and Sealed this

Twenty-ninth Day of April, 1997

*Attest:*

BRUCE LEHMAN

*Attesting Officer*     *Commissioner of Patents and Trademarks*